(12) United States Patent
Gonsalves et al.

(10) Patent No.: US 7,930,256 B2
(45) Date of Patent: Apr. 19, 2011

(54) SECURITY SYSTEM FOR AND METHOD OF DETECTING AND RESPONDING TO CYBER ATTACKS ON LARGE NETWORK SYSTEMS

(75) Inventors: Paul G. Gonsalves, Bolton, MA (US); Catherine Dudley Call, Seattle, WA (US); Stephen Ho, Cambridge, MA (US); David Lapsley, North Andover, MA (US)

(73) Assignee: Charles River Analytics, Inc., Cambridge, MA (US)

( * ) Notice: Subject to any disclaimer, the term of this patent is extended or adjusted under 35 U.S.C. 154(b) by 839 days.

(21) Appl. No.: 11/805,403

(22) Filed: May 23, 2007

(65) Prior Publication Data
US 2008/0010225 A1  Jan. 10, 2008

Related U.S. Application Data

(60) Provisional application No. 60/802,732, filed on May 23, 2006.

(51) Int. Cl.
*G06N 5/00* (2006.01)

(52) U.S. Cl. .......................................... 706/11; 706/45

(58) Field of Classification Search ................ 706/11, 706/45
See application file for complete search history.

(56) References Cited

OTHER PUBLICATIONS

Bharadwaj, Secure Middleware for Situation—Aware Naval C2 and Combat Systems, Proceedings of the Ninth IEEE Workshop on Future Trends of Distributed Computing Systems, 2003, pp. 1-7.*

\* cited by examiner

*Primary Examiner* — Wilbert L Starks, Jr.
(74) *Attorney, Agent, or Firm* — McDermott Will & Emery LLP

(57) ABSTRACT

An improved security system for and method of detecting and responding to cyber attacks on a network or network element. The system comprises: (a) an intelligent agent-based information retrieval subsystem configured so as to automatically search for and retrieve relevant data from distributed sources; (b) a rule-based inferencing mechanism configured so as to interpret retrieved data within the situational context to support event and alert generation for cyber threat assessment and prediction; and (c) a threat assessment and prediction mechanism configured so as to capture relating to the interrelationship between cyber sensor outputs and cyber attacks.

16 Claims, 35 Drawing Sheets

| Data Fusion Levels | Association Process | Estimation Process | Product |
|---|---|---|---|
| DF0 Signal/Feature Assessment | Observation-to-Signal or Feature | Feature Extraction | Estimated Signal / Feature States and Confidences |
| DF1 Entity Assessment | Signal / Feature-to-Entity or Sensor Entity State Report-to-Entity | Attributive Entity State Estimation | Estimated Entity States and Confidences |
| DF2 Situation Assessment | Entity-to-Entity, Entity-to-Relationship, or Relationship-to-Relationship | Relational State Estimation | Estimated Relationships, Situation (set of relationships), and confidences |
| DF3 Impact Assessment | Situation to System Courses of Action | Cost / Benefit Analysis | Estimated / Predicted Entity and Situation Utilities and Confidences |
| DF4 Performance Assessment | System States to Goals | Performance Analysis | Estimated MOPs and MOEs and Confidences |

FIG. 4

| Term | Definition |
|---|---|
| Snort IDS Alerts | Snort is an open source network intrusion prevention system, capable of performing real-time traffic analysis and packet logging on IP networks. It can perform protocol analysis, content searching/matching and can be used to detect a variety of attacks and probes, such as buffer overflows, stealth port scans, CGI attacks, SMB probes, OS fingerprinting attempts, and much more. Snort uses a flexible rules language to describe traffic that it should collect or pass, as well as a detection engine that utilizes a modular plugin architecture. In live (network intrusion detection) mode, Snort is usually configured to output alert messages to a database or log file where they can be visualized by another application. For the INAFS simulation, we ran Snort offline to parse and analyze previously captured data in tcpdump (binary) format and sent the output to a database as in an online system. |
| WhatsUp Professional 2005 | What sUp is Ipswitch's network management application which provides detailed monitoring of network availability and performance including monitoring of Windows services, TCP/UDP ports, event logs and system resources. WhatsUp is available for most MS Windows operating systems and is used by several federal agencies including the US Navy, Army and the Air Force. For the Phase I prototype, we used a 30-day trial version of the software. During the trial, a single target asset was monitored under normal use, and a handful of entries were logged to the WhatsUp database (Microsoft SQL Server) based on activity in the Windows event and error logs. These entries formed the basis of our simulation of receiving notification of abnormal system activity in real time. |
| US-CERT RSS feeds | US-CERT (United States Computer Emergency Readiness Team1) publishes a number of XML RSS 1.0 feeds containing headlines about recently published US-CERT documents. These documents inform subscribers about potential threats to the security of their systems and provide information about how to avoid, minimize, or recover from successful attacks. For the INAFS system, we periodically connected to the US-CERT RSS channel that provides technical cyber alert system documents and downloaded the current set of advisory messages. These were filtered for duplicates and relevancy to our network resources. |
| Application and System Logs | Information retrieval agents obtain relevant data from a variety of historical data sources including IDS logs; system and error logs; and FTP, firewall, and HTTP event and error logs. For the Phase I implementation, we developed log parsing routines for several firewall formats (Honeynet Challenge data), and we used representative data without explicitly parsing log files for FTP and HTTP logs. |
| Dragon Network Sensor | Real-time feeds |
| TCPdump files | Real-time feeds |
| Spade packet anomaly information | Real-time |
| Unix syslog | Real-time |
| Windows Event Logs | Real-time |
| Windows Perfmon Logs | Real-time |
| HTTP logs (IIS and Apache) | Historical |
| @RiskRiverAnalytics 2007 | Historical 52/99   March 20, 2007 |
| Unix host-based memory and load information | Historical |
| Unix syslog | Historical |
| Windows Event Logs | Historical |

FIG. 19

SECURITY SYSTEM FOR AND METHOD OF DETECTING AND RESPONDING TO CYBER ATTACKS ON LARGE NETWORK SYSTEMS

RELATED APPLICATION

This application is based on U.S. Provisional Application Ser. No. 60/802,732 filed May 23, 2006.

FIELD OF THE DISCLOSURE

The disclosure relates to a system for and method of detecting and responding to cyber attacks.

BACKGROUND

Today's information age relies on an extensive network of systems that form the Global Information Grid (GIG). The GIG is threatened by numerous entities including terrorist organizations, hackers sympathetic to enemies of the West, criminal organizations, and nation states interested in cyber warfare capabilities. The ability to detect, and respond to these cyber attacks is a crucial component for the protection of our computer networks and the mission critical software that relies on them. Network monitoring and management systems provide copious amounts of data regarding the status and health of computer networks. Intelligent information filtering and fusion systems are required in order to analyze this data to detect threats, analyze their source, and provide almost instantaneous responses to these threats.

SUMMARY OF THE DISCLOSURE

An improved security system for and method of detecting and responding to cyber attacks on a network or network element. The system comprises: (a) an intelligent agent-based information retrieval subsystem configured so as to automatically search for and retrieve relevant data from distributed sources; (b) a rule-based inferencing mechanism configured so as to interpret retrieved data within the situational context to support event and alert generation for cyber threat assessment and prediction; and (c) a threat assessment and prediction mechanism configured so as to capture relating to the interrelationship between cyber sensor outputs and cyber attacks.

GENERAL DESCRIPTION OF THE DISCLOSURE

FIG. 4 illustrates a table of examples of characteristics of the data fusion levels shown in FIGS. 2 and 3;

FIG. 19 illustrates a table of examples of input streams for developer sensors;

Figure 24:
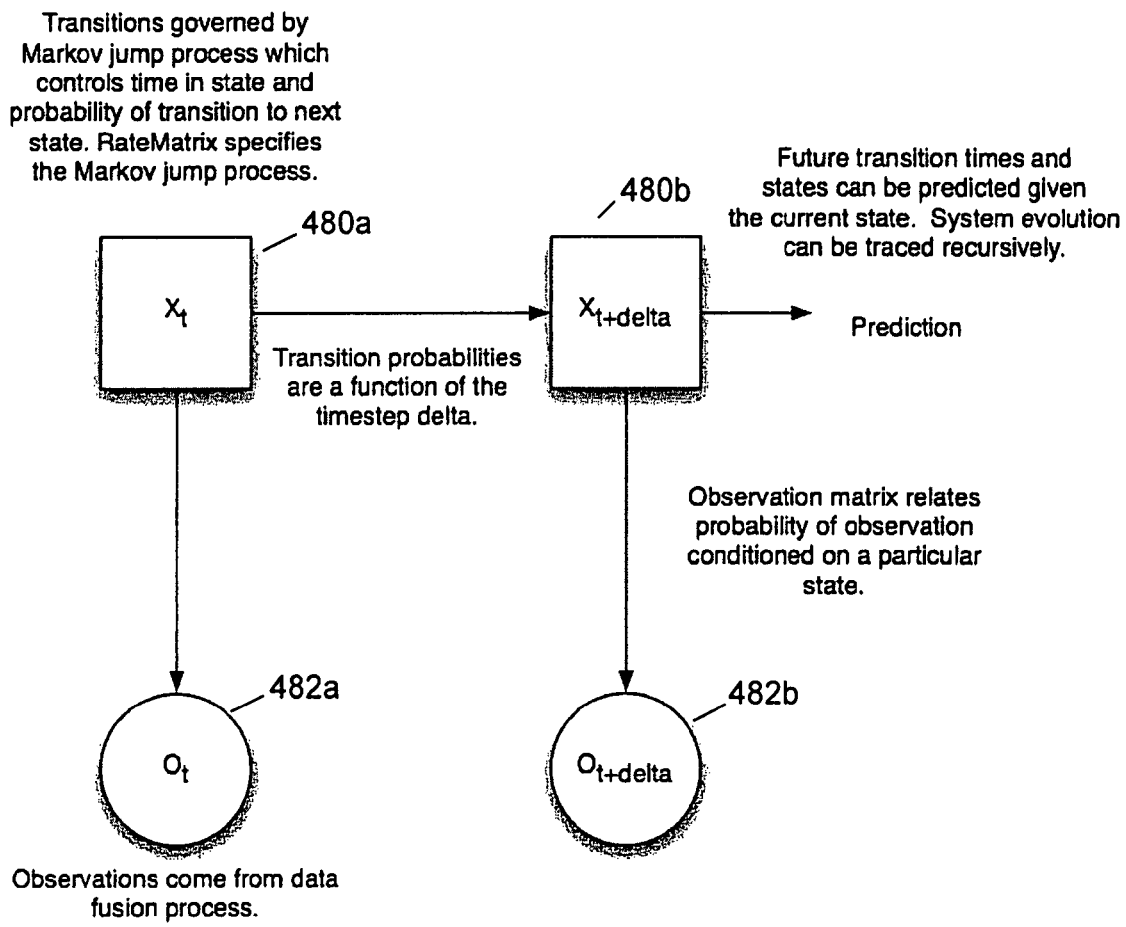
Figure 25:
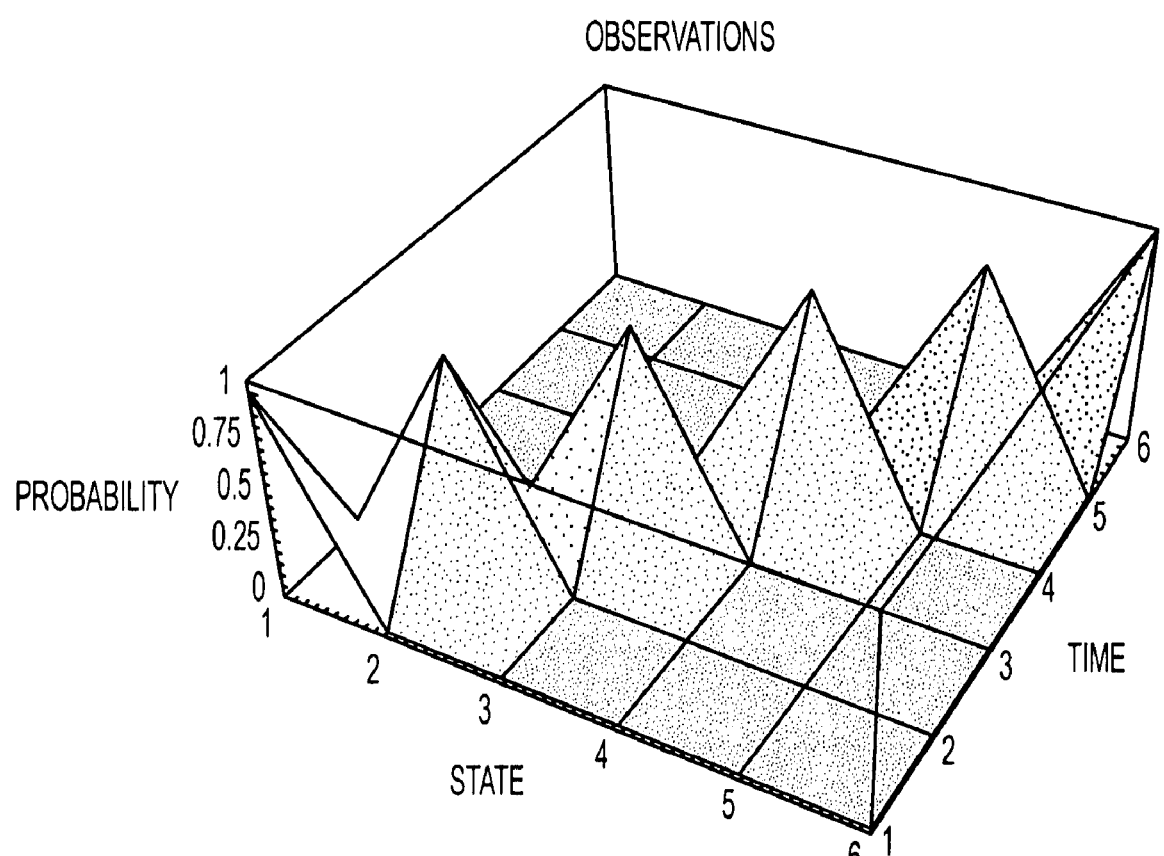
Figure 26:
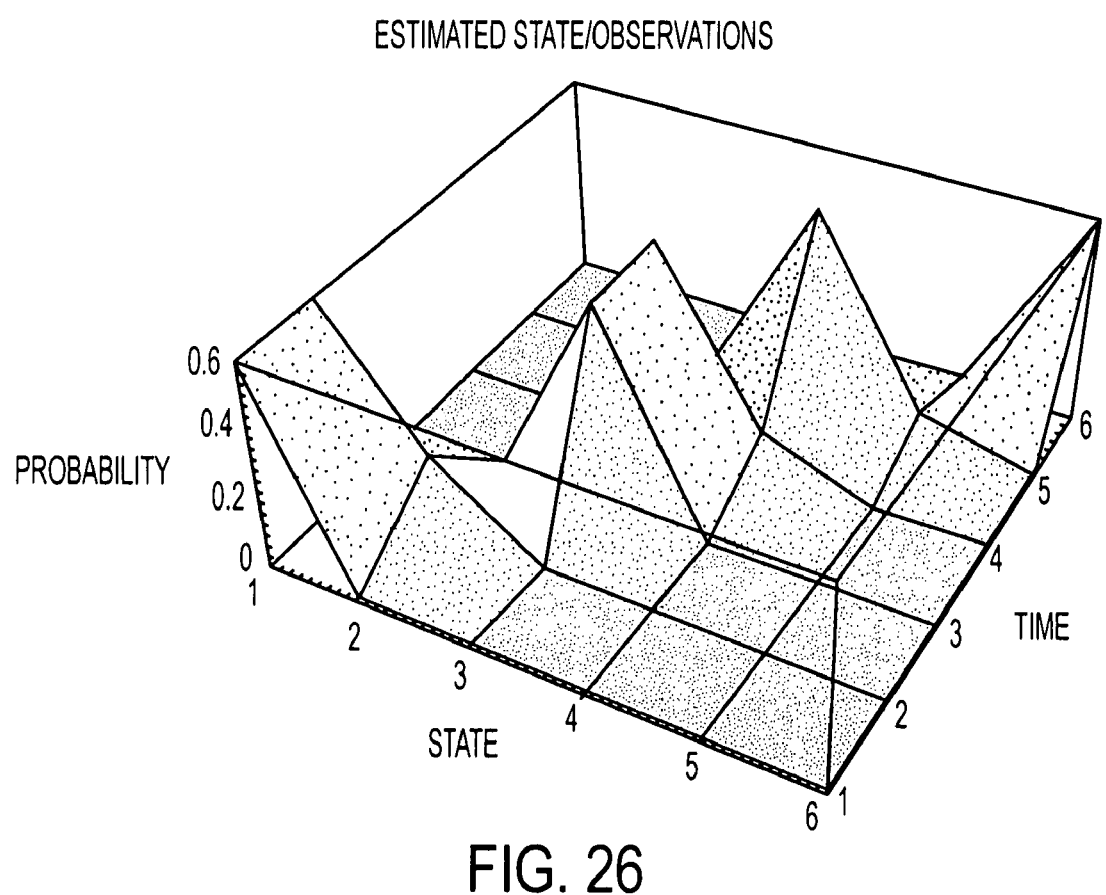
Figure 27:
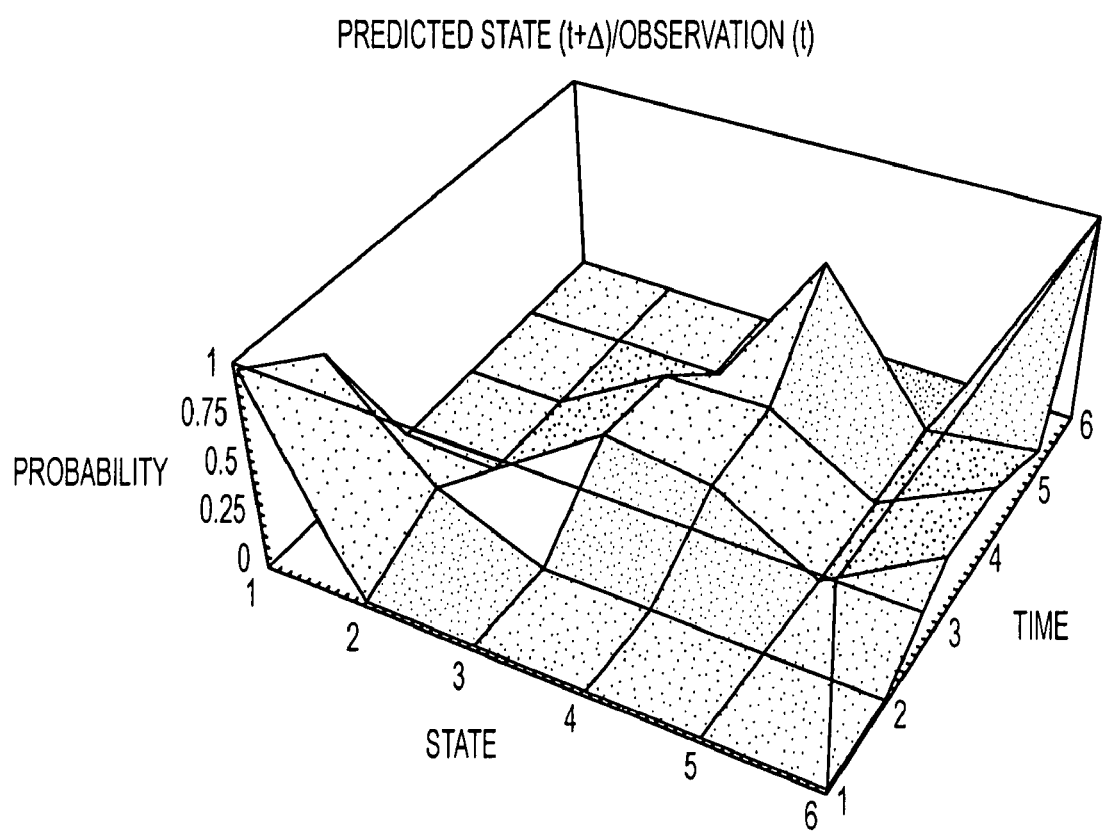
Figure 28:
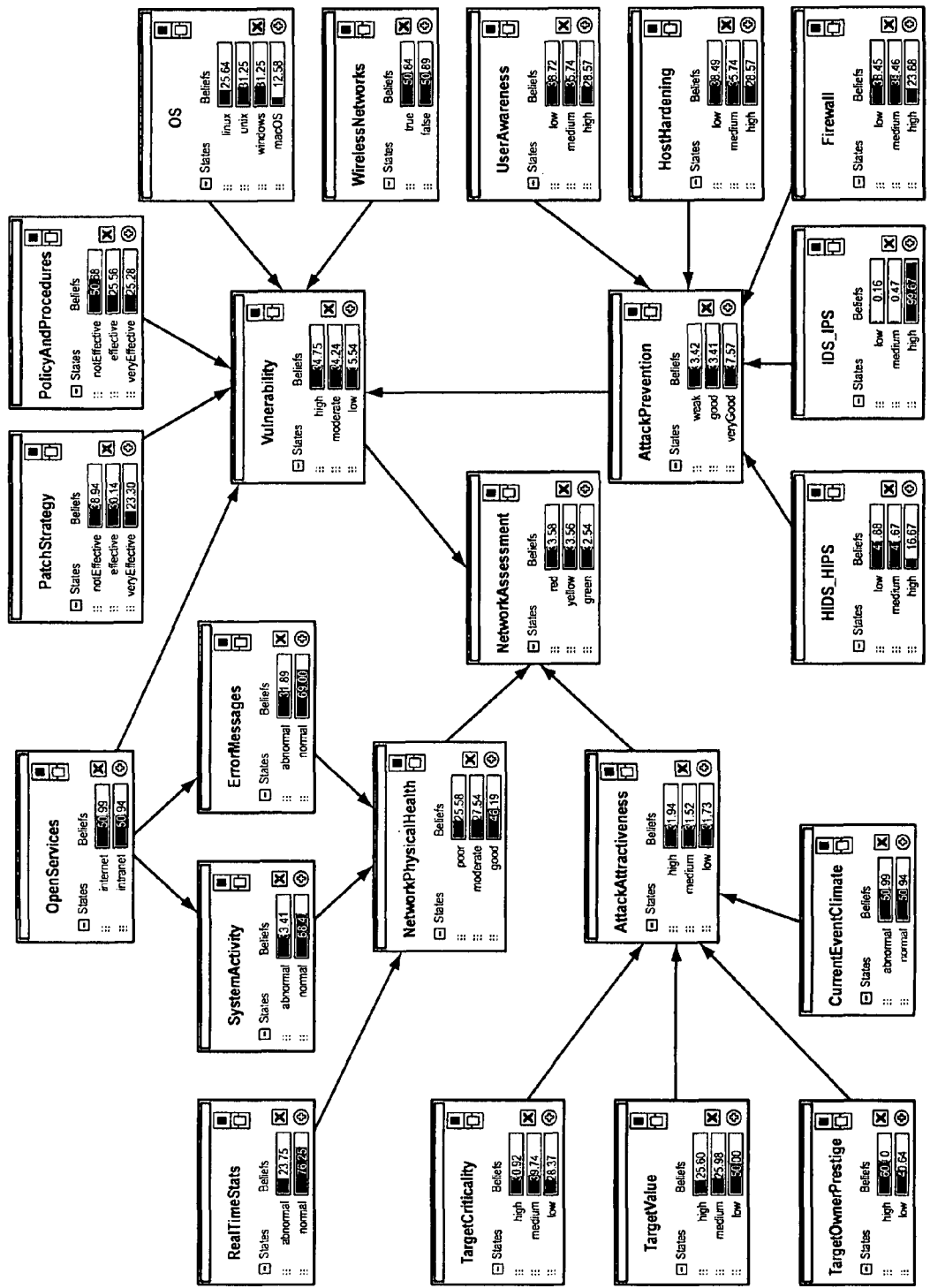
Figure 29:
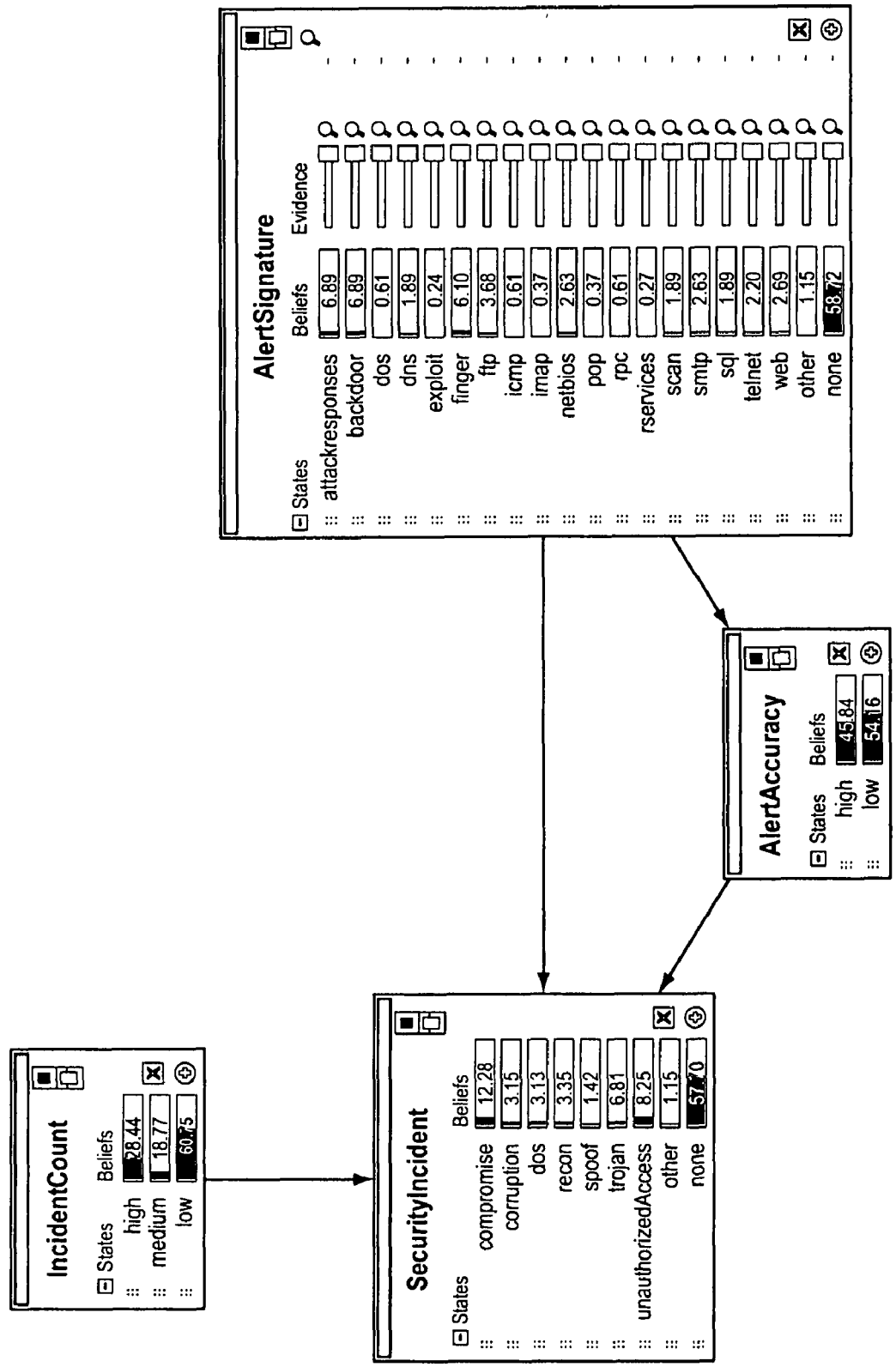
Figure 30:
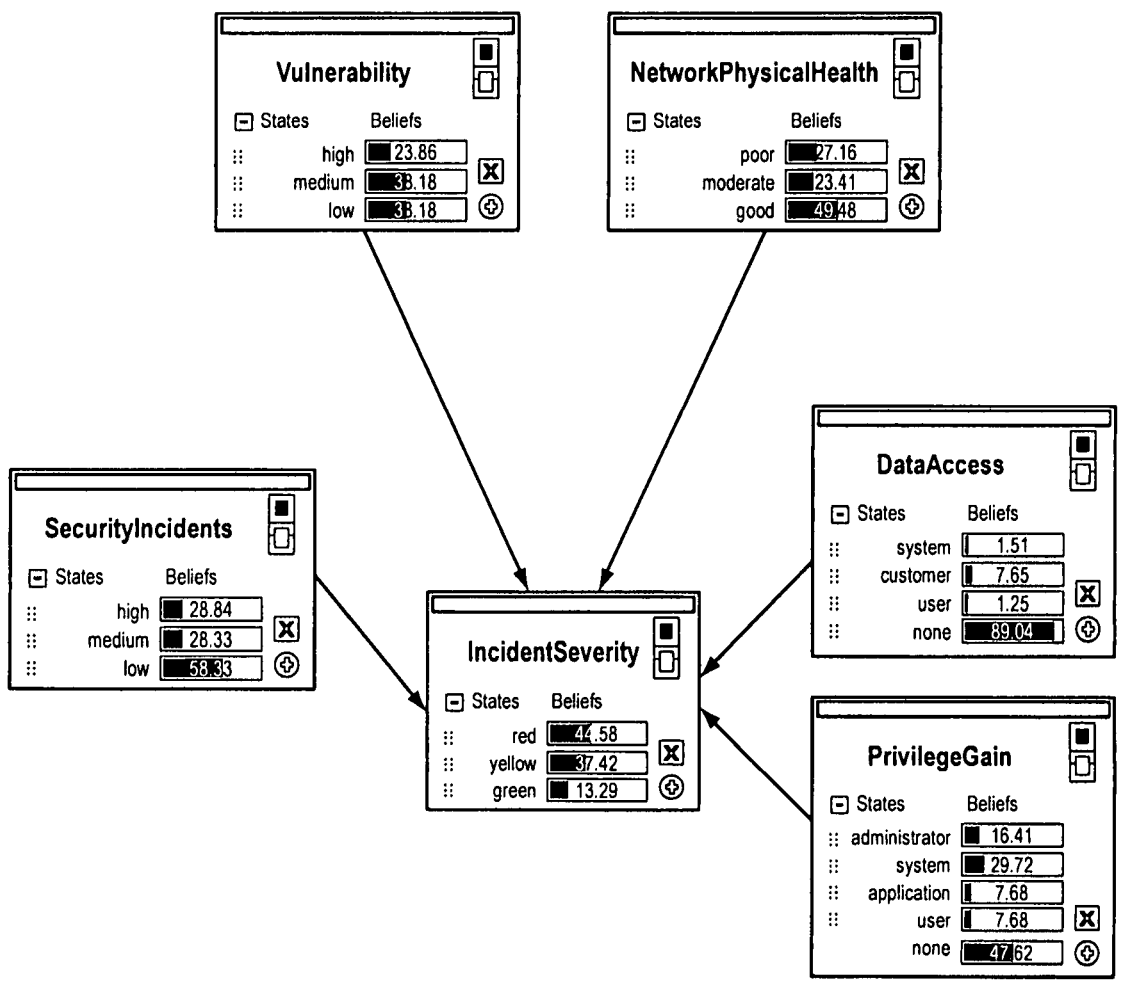
Figure 31:
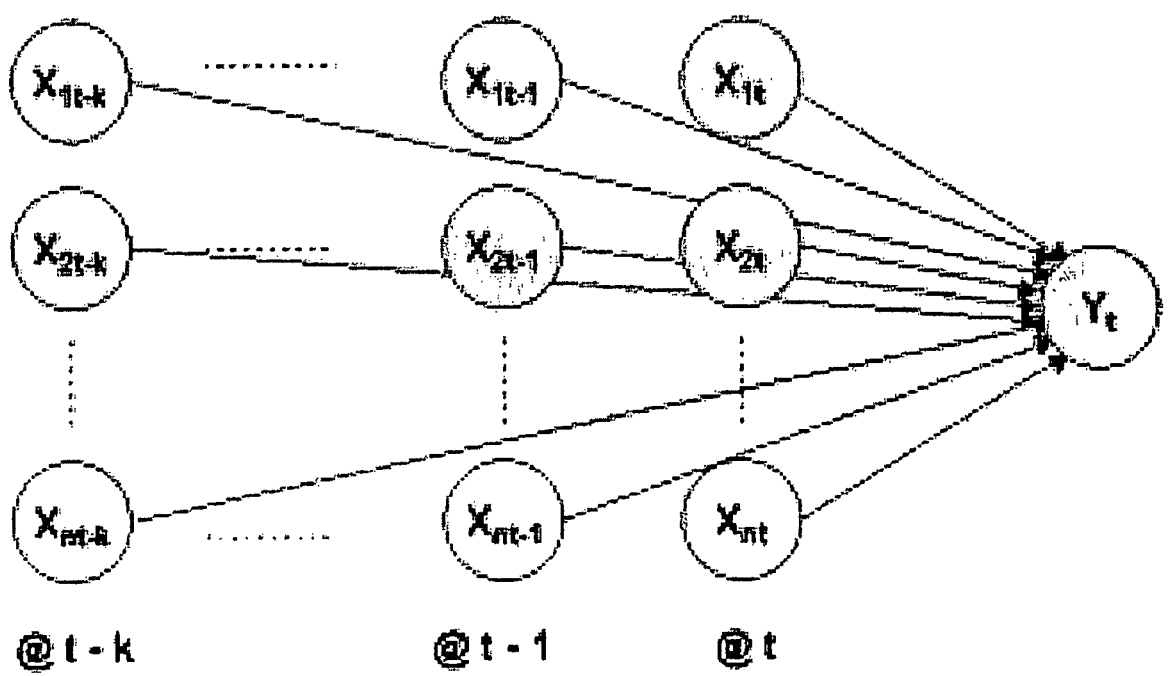
Figure 32:
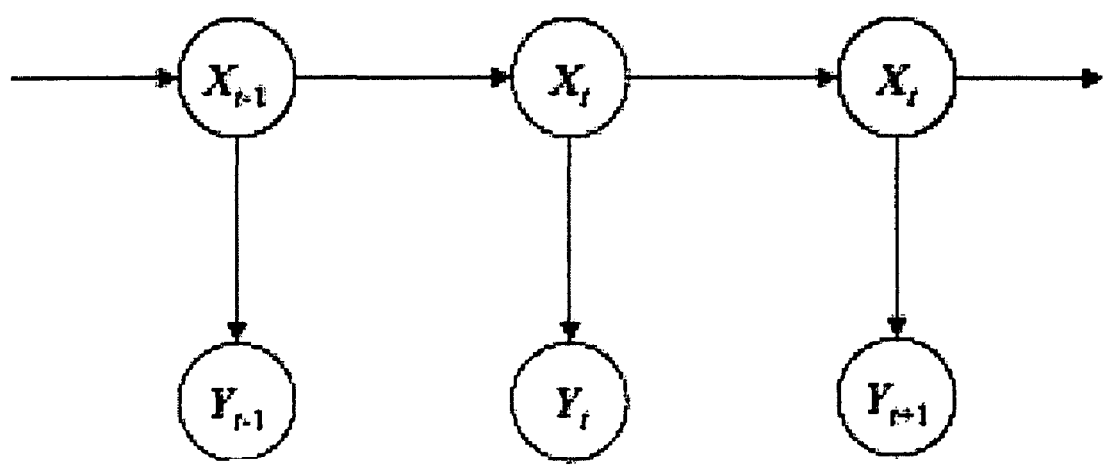
Figure 33:
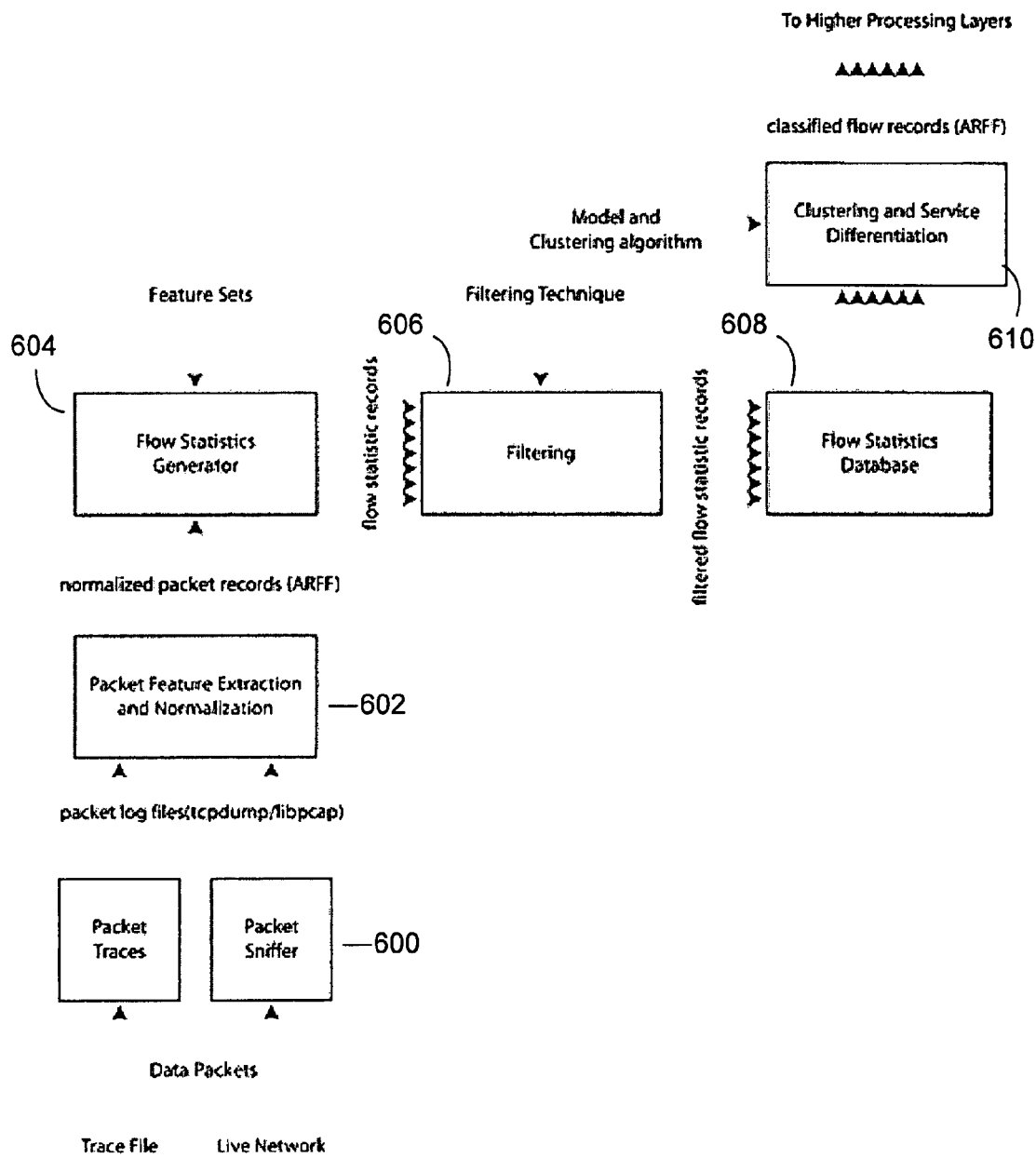
Figure 34:
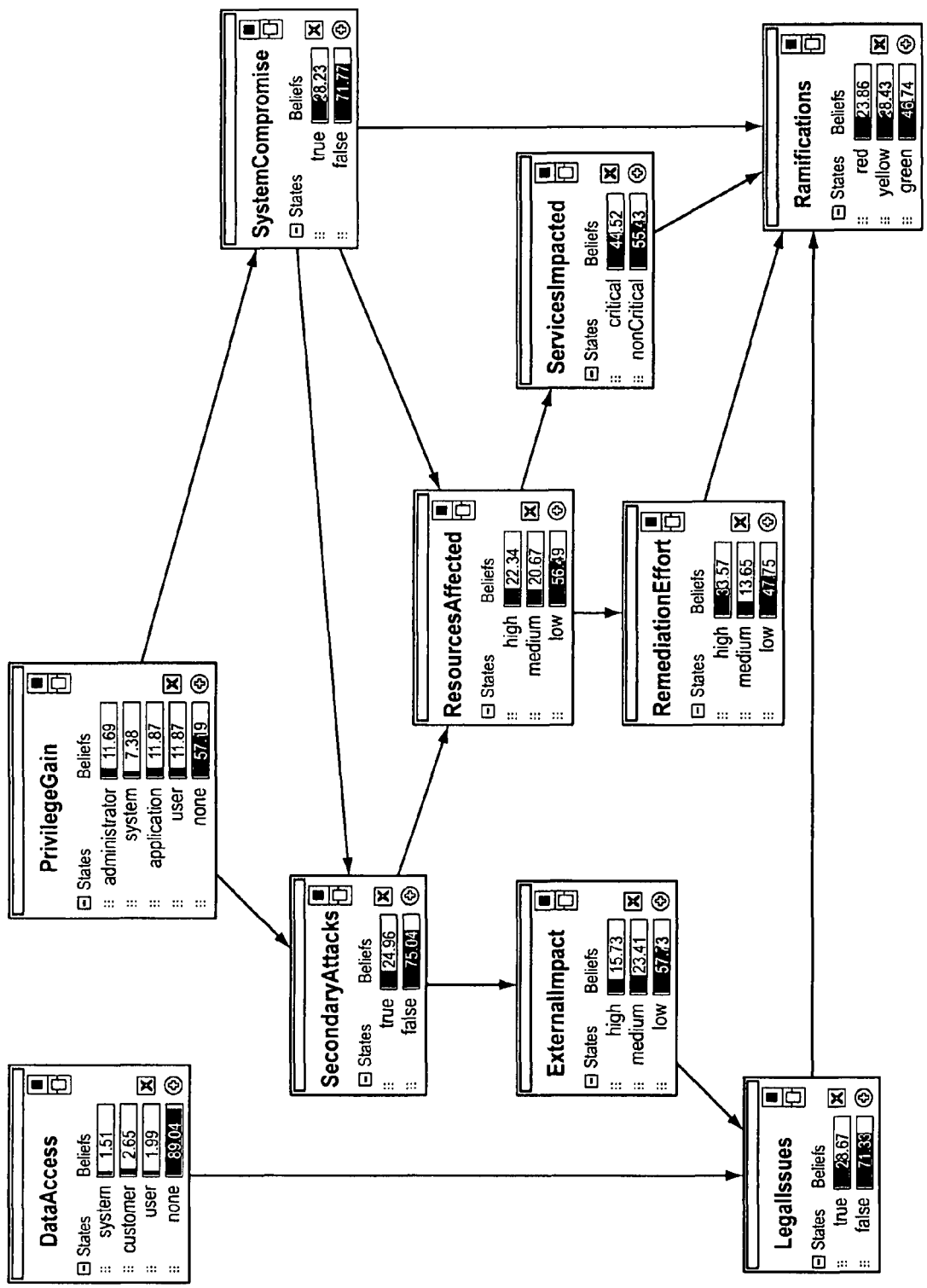

FIG. 24 a simple two phase representation of a Continuous or Dynamic Time Belief Network with two hidden nodes;

FIGS. 25-27 graphically display the information provided in TABLES 3-5, in three dimensional plots showing the relationship of state, time and probability for each example;

FIG. 28 illustrates an embodiment of the network assessment Bayesian network;

FIG. 29 illustrates an embodiment of the incident detection Bayesian network;

FIG. 30 illustrates an embodiment of the network severity Bayesian network;

FIG. 31 illustrates the general temporal dependency of a multiple state model of a dynamic Bayesian network;

FIG. 32 illustrates an example of a dynamic Bayesian network representing a hidden Markov model;

FIG. 33 illustrates an embodiment of the overall processing chain for data fusion; and FIG. 34 illustrates an embodiment of the impact assessment Bayesian network.

DETAILED DESCRIPTION OF THE DISCLOSURE

Figure 1:
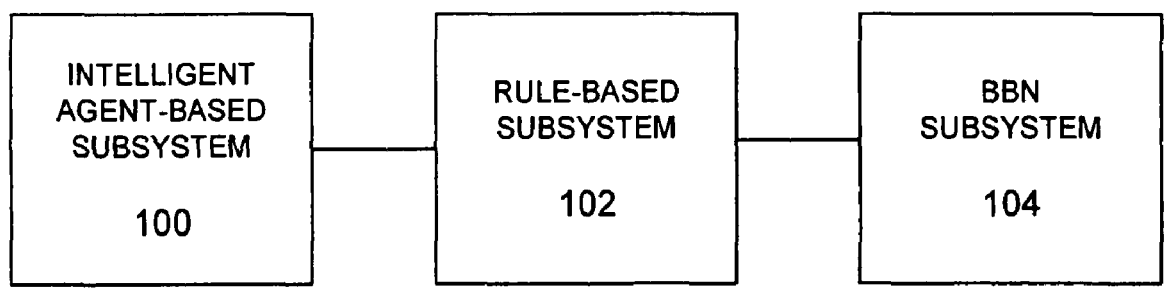
FIG. 1 is a block diagram of one embodiment of the system for detecting and responding to cyber attacks.

A system and method are disclosed for detecting and responding to cyber attacks. As shown in FIG. 1, the system, which is referred herein as an Integrated Network Attack Fusion System (INAFS) includes three components: intelligent agent-based subsystem 100 configured to provide information retrieval of network data; a rule-based subsystem 102 configured to provide event, alert, and suggested response generation based on retrieved information and current network assessment; and a Bayesian belief network subsystem 104 configured to provide detection, response and assessment of a cyber attack.

More specifically, the system is designed to support data and event fusion from multiple network sensors and data sources through a rules engine and belief network model for network situation assessment. The system requirements for the INAFS can therefore include:

A. Information retrieval: the system should support at least two modes of information retrieval: for example, sensor agents that detect and retrieve data from selected sources as information becomes available, and retrieval agents that react to a system query for additional information and translate diverse data sources into consistent data objects.

B. Event or data fusion: the system should respond to aggregate data sources to make meaningful inference from the information. For example, a single port scan can include scant information; however, the aggregation of several related port scans can produce useful event or data information.

C. Rule-based event processing: the system should integrate diverse data sources, generate and post evidence to related Bayesian belief network models.

D. Bayesian belief network assessments: the system should process information from multiple data sources including internal network information and external alerts and notifications; assess multiple network situation factors including vulnerability and intrusion detection.

E. Visualization: the system should provide the user with a subsystem constructed to observe the network state as well as a concise summary of the most critical assessment parameters.

Next, an algorithm development approach and architecture design is provided; data parsing methodologies are developed to convert and store data feeds into a relational database; a data ontology is designed to assist in the retrieval, communication, and processing of security events, network events, and data retrieval events; an information retrieval mechanism is constructed to address the need to process some data streams as they become available as well as context-based data retrieval; and a rule-base is designed to support data management and evidence generation for the belief network model for network situation assessment. The system includes a library of Bayesian belief networks, which in turn comprises multiple models to address different aspects of situation awareness including vulnerability, security incident identification and assessment, and impact assessment. The models are more specifically described below and in the attachments.

In order to carry out these features, the INAFS also includes an INAFS Security Incident and Event Manager (SIEM). The INAFS SIEM is a tool that can be deployed on a workstation or as a standalone appliance. The INAFS SIEM preferably provides a number of key features for securing a network: vulnerability assessment; network attack detection; network attack prediction; impact assessment; and remediation/mitigation.

Figure 2:
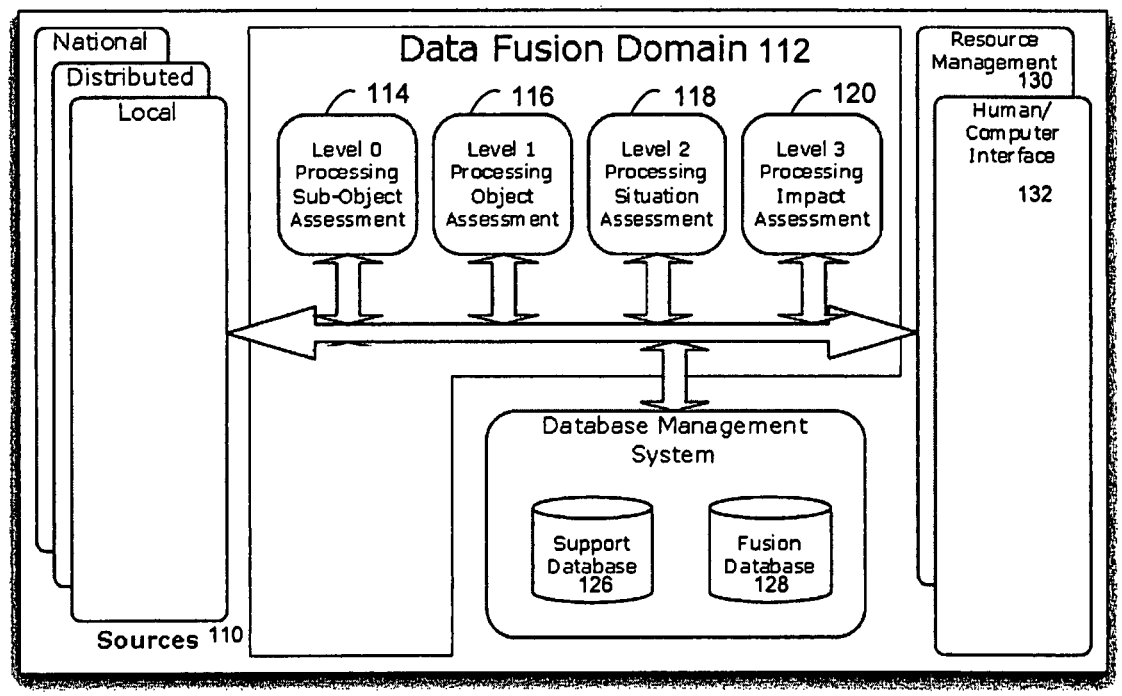
FIG. 2 is an embodiment of a modified JDL architecture for detecting and responding to cyber attacks.
Figure 3:
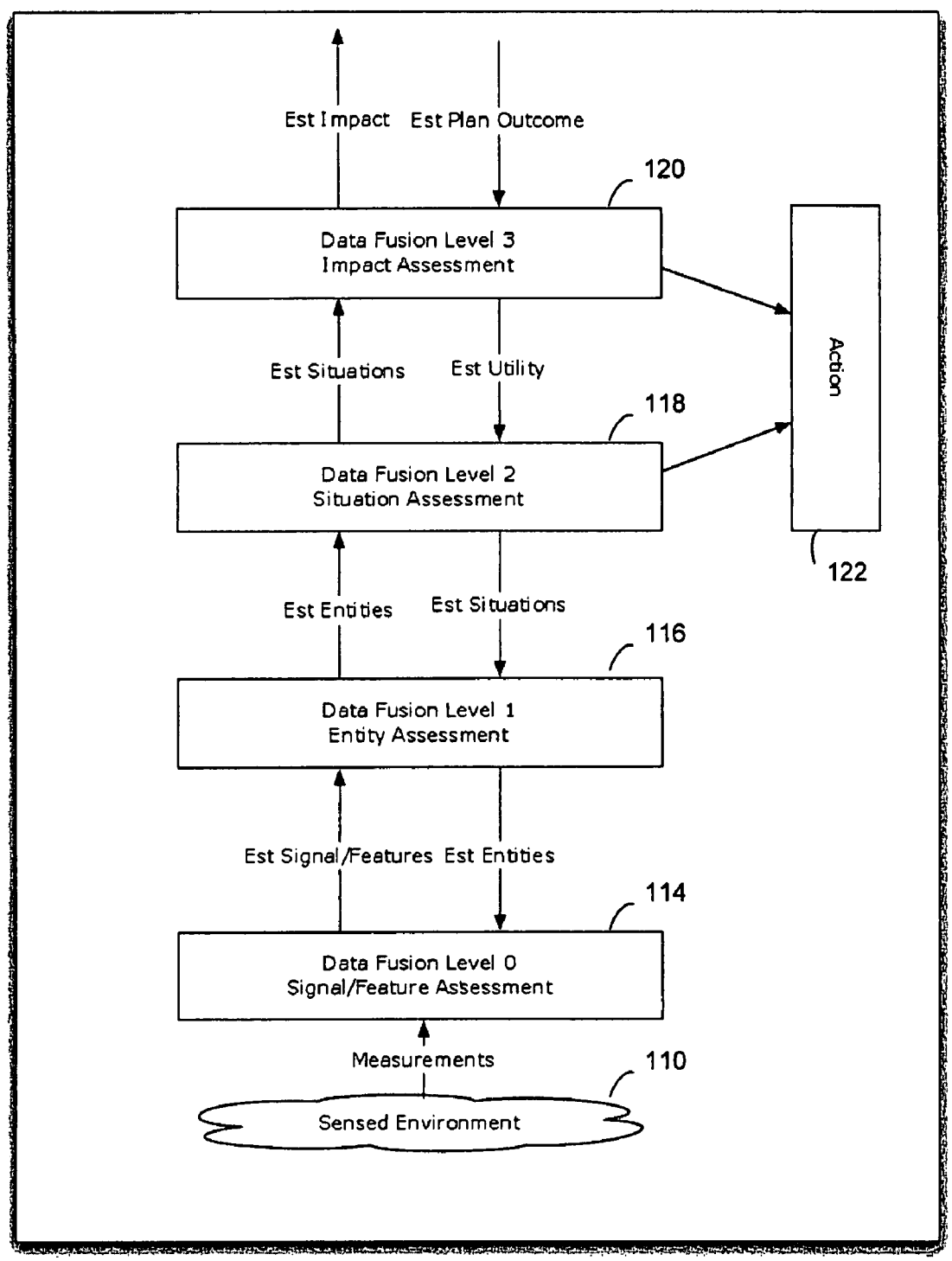
FIG. 3 illustrates further details of the architecture of FIG. 2.

In one embodiment the INAFS SIEM implements the intelligent agent-based subsystem 100 by using a data fusion architecture configured to facilitate the acquisition, processing, comprehension and visualization of network data. One embodiment of the data fusion architecture is of a JDL type, the latter being a data fusion architecture developed by the Joint Directions of Laboratories under the guidance of the U.S. Department of Defense. The data fusion model of the system of the present disclosure can be in the form of an architecture such as shown in a high level illustration in FIG. 2. As shown, data is being received by the network from various sources 110. Data from these sources are forwarded to the bottom of the Data Fusion stack (Data Fusion Level 0) in the data fusion domain 112. Referring to FIG. 3, the architecture data fusion domain 112 is shown, wherein the functions at each level of the Data Fusion stack include: Data Fusion Level 0 (114)—Signal/Feature Assessment: the measurements are processed, assessed for validity, any features of interest extracted and the data then forwarded up to the next layer, Data Fusion Level 1 (116)—Entity Assessment: the measurements from Level 0 are processed to determine the existence of the entities producing the signals/features recorded by Level 0, Data Fusion Level 2 (118)—Situation Assessment: relationships between the entities identified by Level 1 are determined by processing the data associated with those entities; and Data Fusion Level 3 (120)—Impact Assessment: the impact of the current situation identified in Level 2 on the operation of the network and mission is assessed by applying a suitable utility function/functions to the situation, whereupon the appropriate action 122 is taken as shown in FIG. 3. The data fusion architecture also includes database management system 124 including a support database 126 and a fusion database 128. In addition, the architecture includes a resource management module 130 and a user interface 132.

The Table of FIG. 4 summarizes the characteristics of the these Data Fusion Levels.

The data fusion model can comprise a number of features, which are summarized as follows:

A. Flow-based Analysis: Flows are streams of IP packets between computers on a network. Flows have a source and destination computer. Flow-based analysis collects statistics on flows between computers and analyzes those statistics to determine service categories, detect anomalous behavior and determine the degree of similarity between flows (for use in collusion discovery).

B. IDS Alerts: Alerts from an intrusion detection system (IDS) such as the open source Snort IDS can be collected and used in conjunction with other information to identify potential network attacks.

C. Application Alerts: Alerts from applications are collected and used in conjunction with other information to identify potential network attacks.

D. Security Incident Detection using Dynamic Bayesian Belief Networks: The detection of security incidents is facilitated by the use, for example of Hidden Markov Model Dynamic Bayesian Belief Networks (described hereinafter).

E. Multi-Target Tracking: Provides the identification and tracking of multiple entities through the processing and correlation of events.

F. Collusion Discovery: Detects collusion (e.g., botnets) of multiple entities within a network through the use of flow-based correlation.

G. Belief Networks: Are used for providing inferencing at the Situation Awareness and Impact Assessment levels.

Mapping these techniques to the previously describe data fusion level approaches:

DF0 Signal/Feature Assessment: Flow-based Analysis, IDS Alerts and Application Alerts.

DF1 Entity Assessment: Security Incident Detection using Dynamic Bayesian Belief Networks Multi-target Tracking.

DF2 Situation Assessment: Belief Networks; Collusion Discovery

DF3 Impact Assessment: Belief Networks

Use Cases

Figure 5:
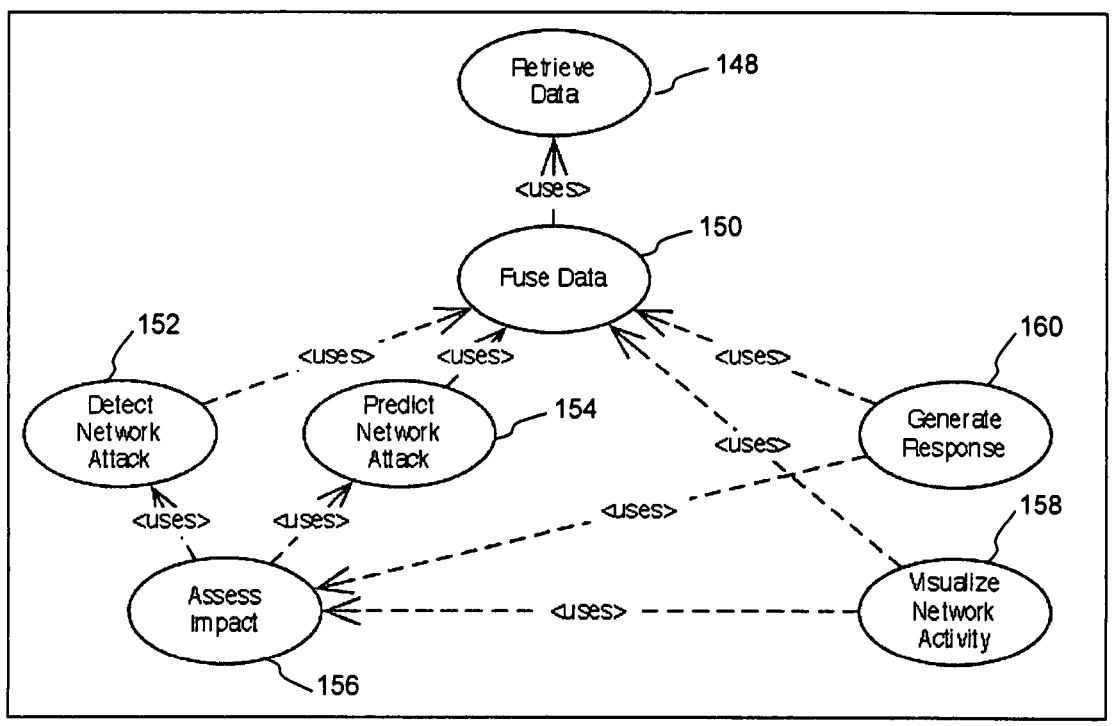
FIG. 5 illustrates one embodiment of an overview of a use case.

Use cases provide a technique for capturing functional requirements of a software system and systems-of-systems. FIG. 5 shows the relationship among the main system use cases. The 'uses' association show where one use case 'uses' another use case. The Retrieve Data 148 use case is used by the Fuse Data 150 use case. The Fuse Data 150 use case is used by the Detect Network Attack 152, Predict Network Attack 154, Assess Impact 156, Visualize Network Activity 158 and Generate Response 160 use cases. Note that the Visualize Network Activity 158 and Generate Response 160 use cases both use two use cases: Fuse Data 150 and Assess Impact 156. It is also noted that any use case that uses the Fuse Data 150 use case, implicitly uses the Retrieve Data 162 use case.

Figure 6:
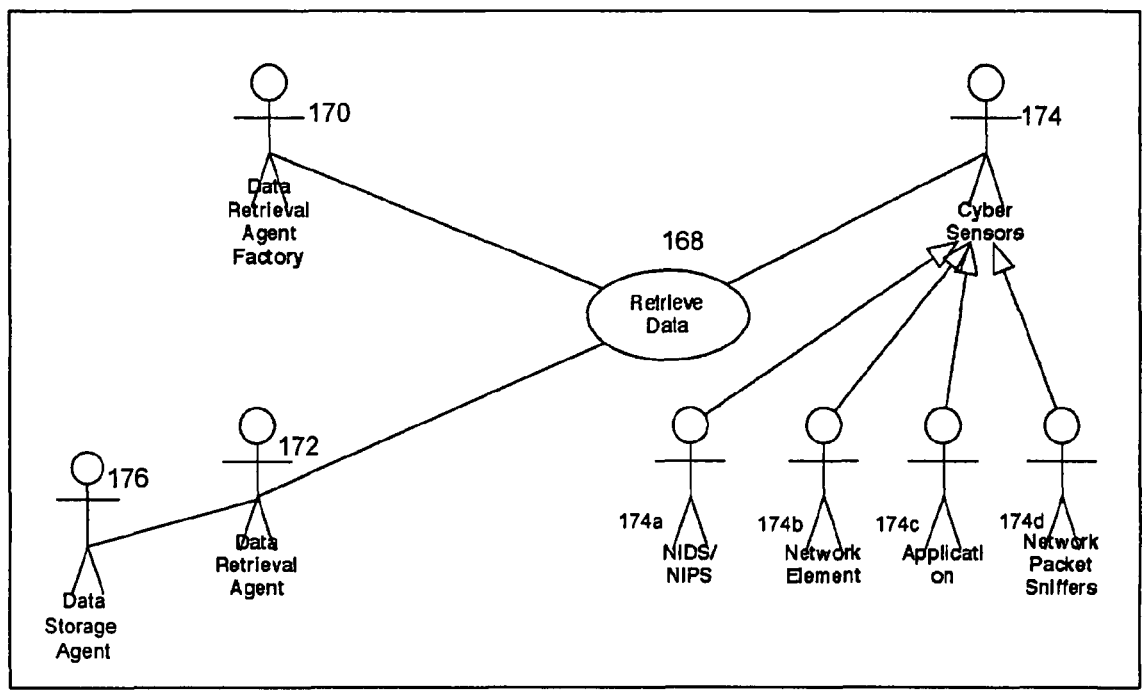
FIG. 6 illustrates one embodiment of the retrieve data use case of FIG. 5.

As shown in FIG. 6, in one embodiment the Retrieve Data 168 use case starts when a data retrieval request is received by the system. A Data Retrieval Agent Factory 170 spawns one or more Data Retrieval Agents 172 to service the request. The Data Retrieval Agents 172 retrieve data from one or more Cyber Sensors 174 and then forward the retrieved data to a Data Storage Agent 176 which stores the information in a persistent database. The use case also shows examples of Cyber Sensors: Network Intrusion Detection Systems/Network Intrusion Prevention Systems (NIDS/NIPS) 174a, Network Elements (e.g. routers, switches, etc.) 174b, Applications 174c, and Network Packet Sniffers 174d. Depending on the application any number and other types of sensors can be used.

Figure 7:
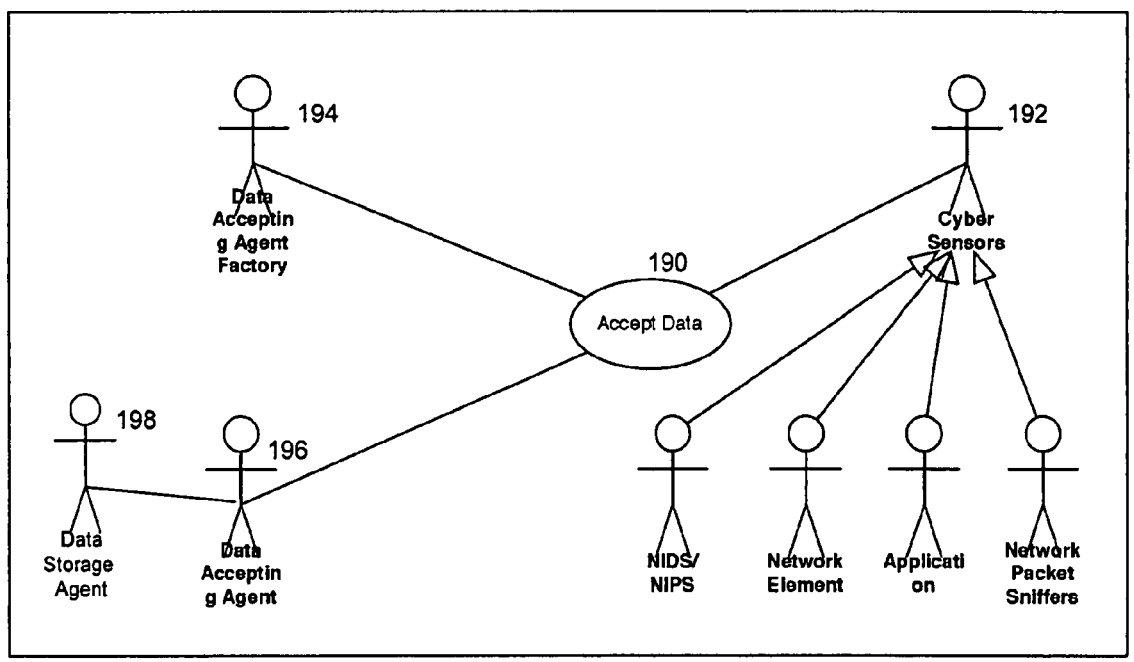
FIG. 7 illustrates one embodiment of the accept data use case of FIG. 5.

FIG. 7 illustrates an embodiment of an Accept Data Use Case 190. The Accept Data use case 190 begins when an Accept Data request is received by the system. The request specifies that one or more Cyber Sensors 192 will periodically push data to the system and that data must be received, processed and stored. In response to the request, a Data Accepting Agent Factory 194 spawns one or more Data Accepting Agents 196. These agents sit and listen for incoming data from the specified Cyber Sensors 192 and forward any received data to a Data Storage Agent 198. The Data Storage Agent 198 then stores that information in a persistent database.

Figure 8:
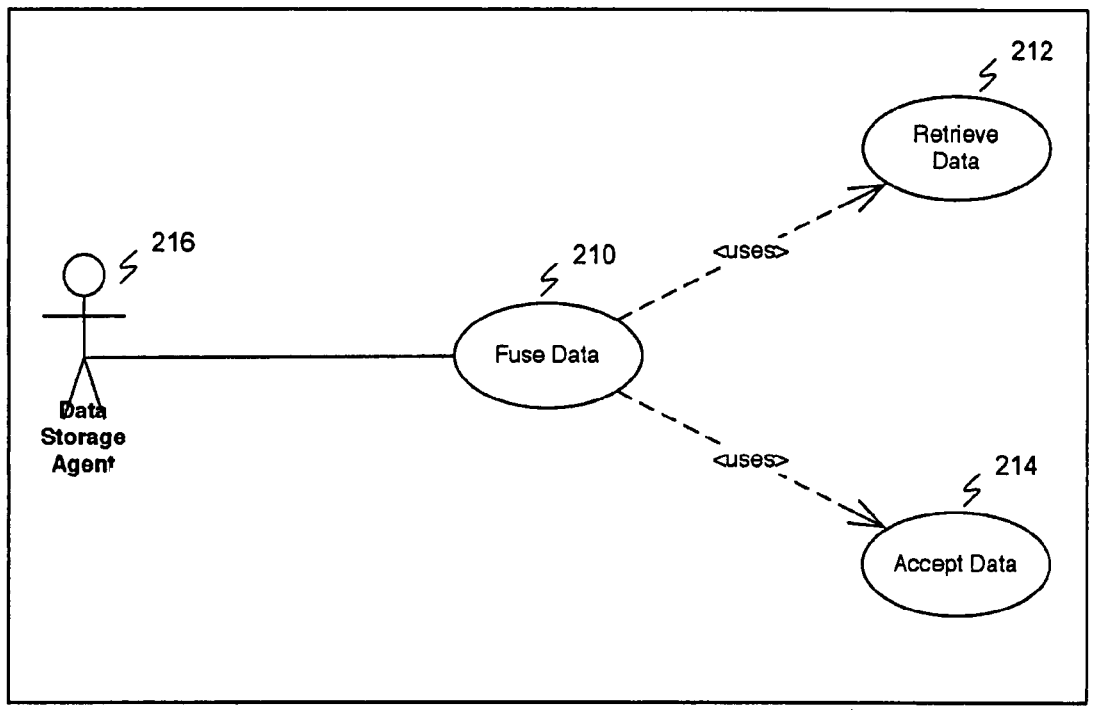
FIG. 8 illustrates one embodiment of the fused data use case of FIG. 5.

In FIG. 8 illustrates an embodiment of a Fuse Data Use Case 210. The use case includes the Retrieve Data 212 and Accept Data 214 use cases. The use case begins when data has been retrieved or accepted by one or more Data Retrieval/Accepting Agents 216 and stored in a persistent database. Each Data Storage Agent 216 provides access to the raw retrieved data. The data is then "fused" and "normalized". The fusion process reduces (ideally removes) any redundancy in received data due to, for example, the same event or measurement being reported multiple times by different sensors. The fusion process also verifies the validity of received data. The normalization process involves the conversion of heterogeneous events and measurements into a common format that can then be stored in a persistent evidence store.

Figure 9:
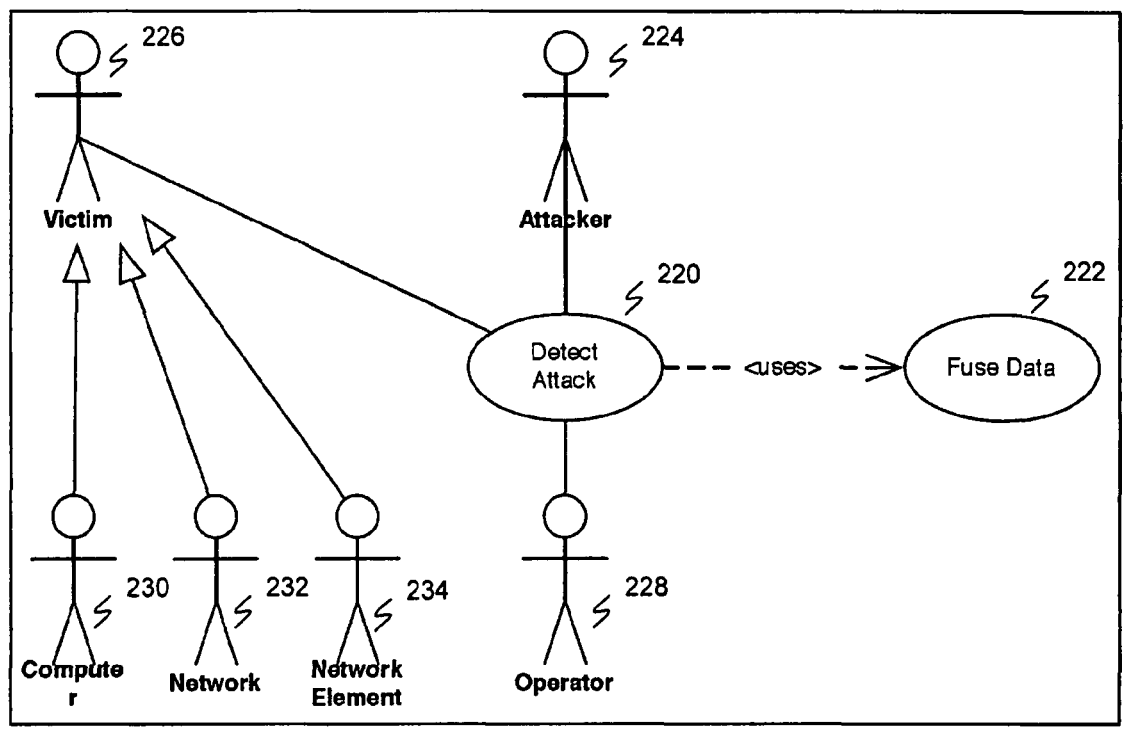
FIG. 9 illustrates one embodiment of the detect network attack data use case of FIG. 5.

FIG. 9 illustrates an embodiment of a Detect Attack Use Case 220. This use case includes the Fuse Data use case 222. The Detect Attack use case 220 begins when an Attacker 224 attacks a Victim 226 protected by the INAFS. The Victim 226 could be any type of system vulnerable to a cyber attack, such as a computer, a network, or a network element, illustrated at 230, 232, 234. Information collected by the Fuse Data 222 use case is processed so as to detect an attack when such an attack is in process. The System Operator 228 is alerted to the attack.

Figure 10:
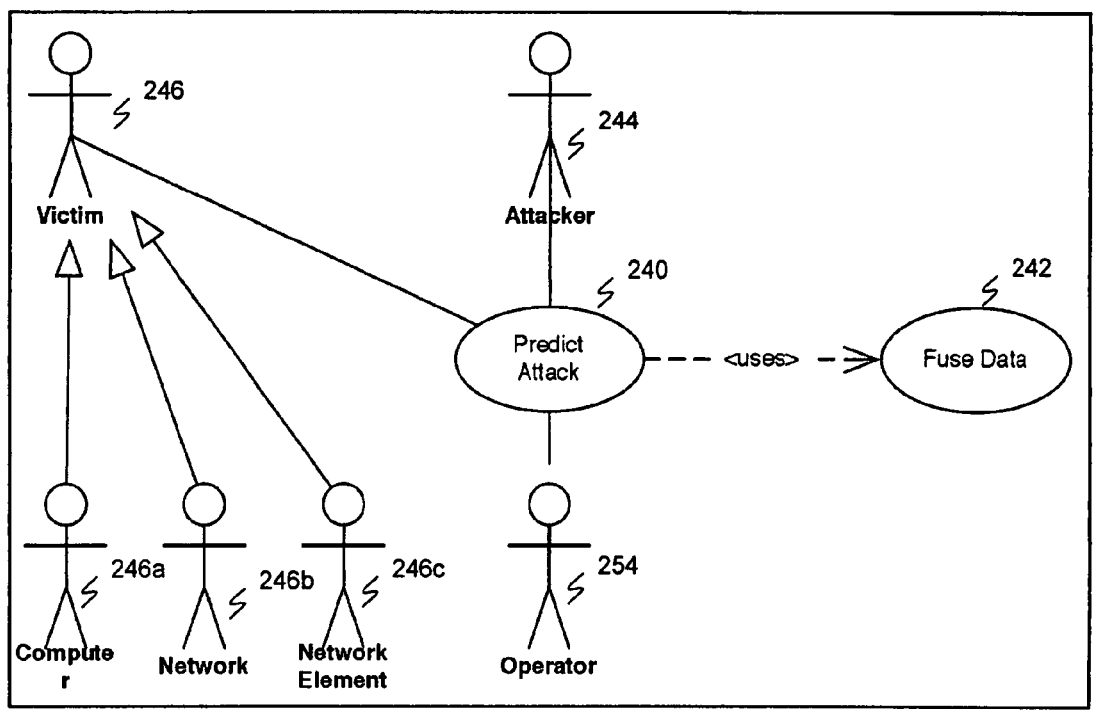
FIG. 10 illustrates one embodiment of the predict attack use case of FIG. 5.

In FIG. 10, an embodiment of the Predict Attack 240 case use is shown. This use case includes the Fuse Data 242 use case. The Predict Attack 240 use case begins when an Attacker 244 prepares to attack a Victim 246. As in FIG. 9, the Victim 246 could be any system vulnerable to a cyber attack, such as a computer 246a, a network 246b, a network element 246c, or other system or device. Information collected by the Fuse Data 242 use case is processed and predicts the probability that an attack is currently under way and the probability that the attacker will be the instigator of an attack. The System can then report to the Operator 254 that the predicted attack, attack probability and probability that the Attacker 244 is the instigator.

Figure 11:
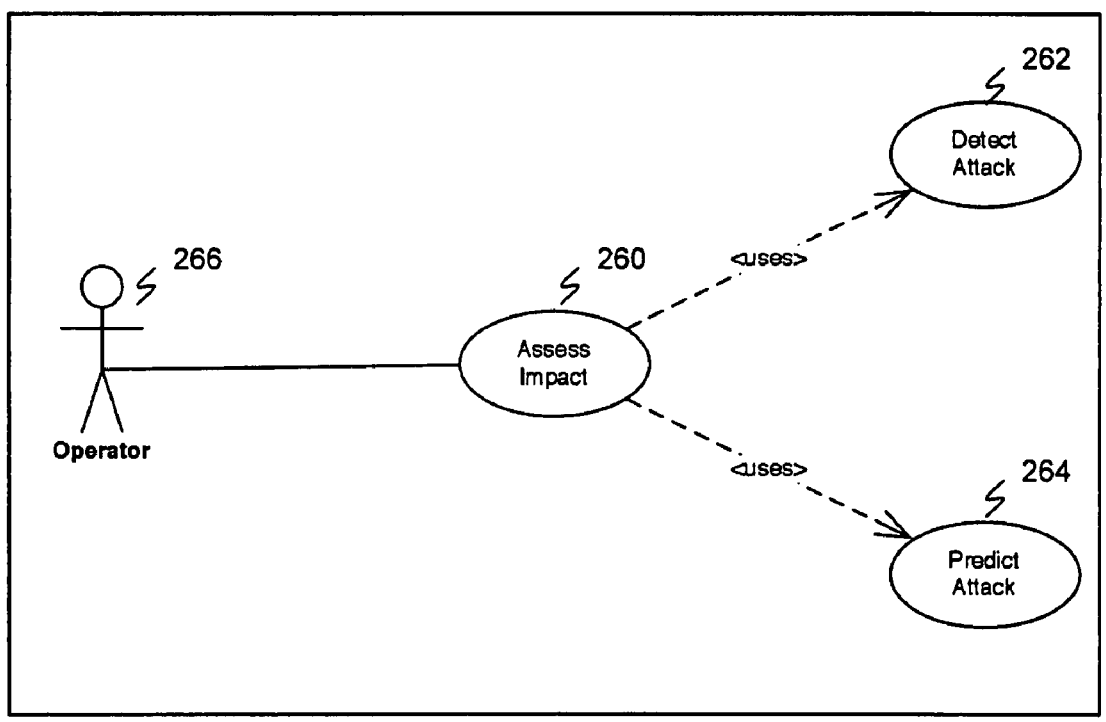
FIG. 11 illustrates one embodiment of the access impact use case of FIG. 5.

Referring to FIG. 11, an embodiment of the Assess Impact 260 use case includes the Detect Attack 262 and Predict Attack 264 use cases. The Assess Impact 260 use case begins when an attack is detected or predicted. The system processes the attack detection/prediction data and assesses the impact of the detected/predicted attack on the operation of the Victim(s) of the attack, and passes the information on to the Operator 266.

Figure 12:
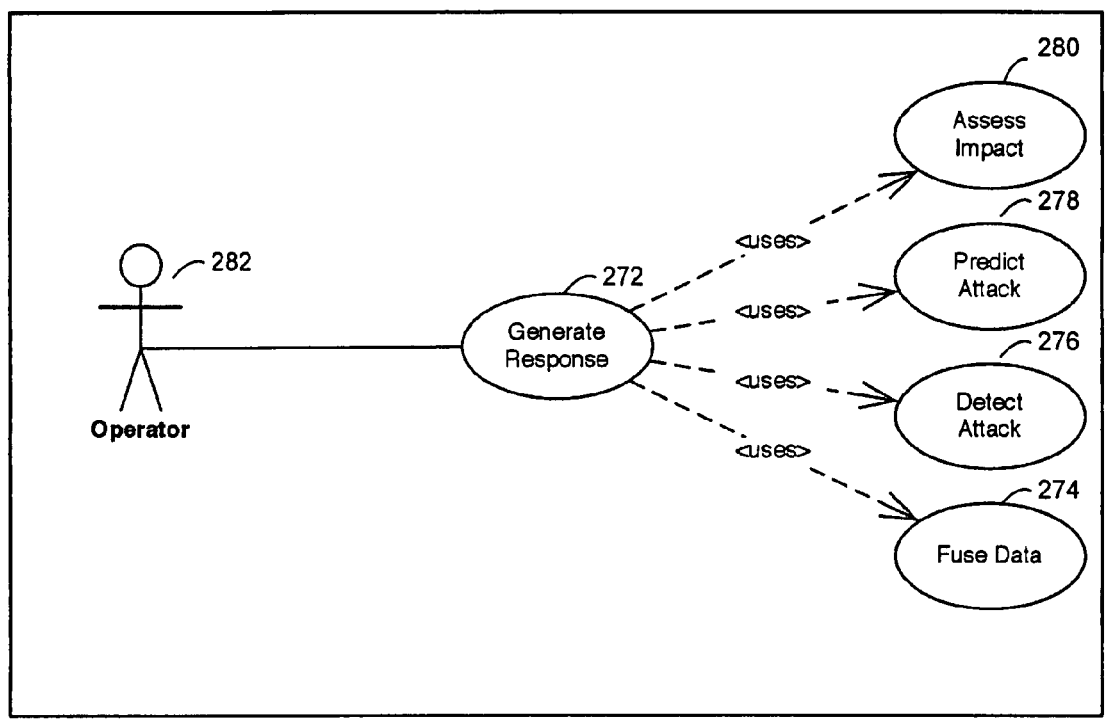
FIG. 12 illustrates one embodiment of the generate response use case of FIG. 5.

FIG. 12 illustrates an embodiment of a Generate Response 272 use case. The latter includes the Fuse Data 274, Detect Attack 276, Predict Attack 278, and Assess Impact 280 use cases. The Generate Response use case begins when information from one or more of the included use cases becomes available. The System generates a response based on the information and then displays the recommended response to the Operator 282.

Figure 13:
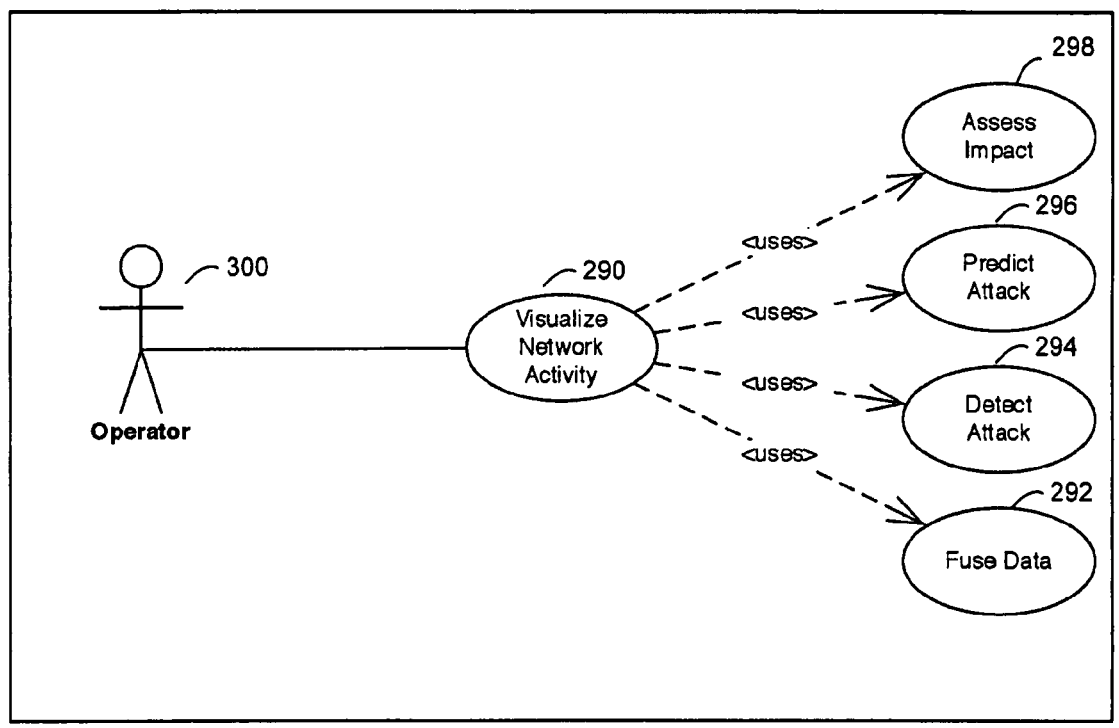
FIG. 13 illustrates one embodiment of the visualize network activity use case of FIG. 5.

Finally, FIG. 13 illustrates an embodiment of the Visualize Network Activity 290 use case. The Visualize Network Activity 290 use case can include the Fuse Data 292, Detect Attack 294, Predict Attack 296, and Assess Impact 298 use cases. The Visualize Network Activity 290 use case begins when information from one or more of the included use cases becomes available. The System generates a visual representation of the information and then displays this representation to the Operator 300.

Data Acquisition

Referring to the data acquisition level of the INAFS, assessing and predicting the effects cyber attacks have on a victim, such as a network, requires access to a disparate set of real-time and historical information. These data are typically available via different protocols, in varying formats, and from sources distributed across the network of interest and the internet at large. In such a system, data is being logged and exchanged at a very high volume, and the introduction of a new service to examine and interpret the data brings with it the risk of overloading the very system it is intended to protect. While such a service must necessarily react in real time to real and potential security threats raised by cyber sensors, correlation of these data with recent and historical application and system records must be approached cautiously. Approaches to querying distributed heterogeneous data sources, which may include traditional databases, knowledge bases, event and data streams, programs, binary and clear-text application and system log files, etc., can include two approaches:

A. A lazy or on-demand approach, where information is extracted from the sources only when additional information is required.

B. An eager or in-advance approach, where relevant information is extracted in advance or in real-time in anticipation to information needs and stored in a central repository.

Answering a query in a lazy approach usually involves the following steps. First a set of appropriate data sources is determined to answer a given query, and then appropriate sub-queries are generated for each data source. Results from the data sources are translated, filtered, and merged to obtain the answer to the query, and returned to the requester.

On the other hand, in an eager approach, data from each source that may be of interest is extracted in advance, and then translated and filtered appropriately. Extracted data from various sources are then merged and stored in a centralized repository, which is known as a data warehouse. A query is evaluated directly in the data warehouse without accessing the original data sources.

A lazy approach will incur some inefficiencies and delay in query processing, especially when queries are issued multiple times. This approach is most appropriate for a frequently changing list of relevant data sources, for data that are changing rapidly, for systems with unpredictable needs, or for queries that operate over vast amounts of data from very large numbers of distributed data sources, such as firewall or web server logs. It is simply not practical to create another data repository from several data sources that are already huge and maintained autonomously at various disparate sites in the network. Thus, adopting an on-demand approach for distributed heterogeneous network situation assessment information seems more appropriate. The on-demand approach to data retrieval requires an infrastructure for retrieving data from distributed data sources based on the query requests that are generated from the rule-based event processing component and from the user interface. Mobile agents have been used for information and data retrieval. Mobile agents are autonomous agents that include behavior, state, and location information, and typically require two components for implementation. The portion of the agent that moves around the network, the mobile agent itself, is often referred to as an agent process. As mobile agents travel from location to location, they need a place to reside where they can execute. This place is often referred to as a place process or agency. In one embodiment of the present system, mobile agents are used because of their ability to carry with them data processing code to the site of the data, allowing for a substantial reduction in the amount of unprocessed data that needs to be transferred across a network.

Figure 14:
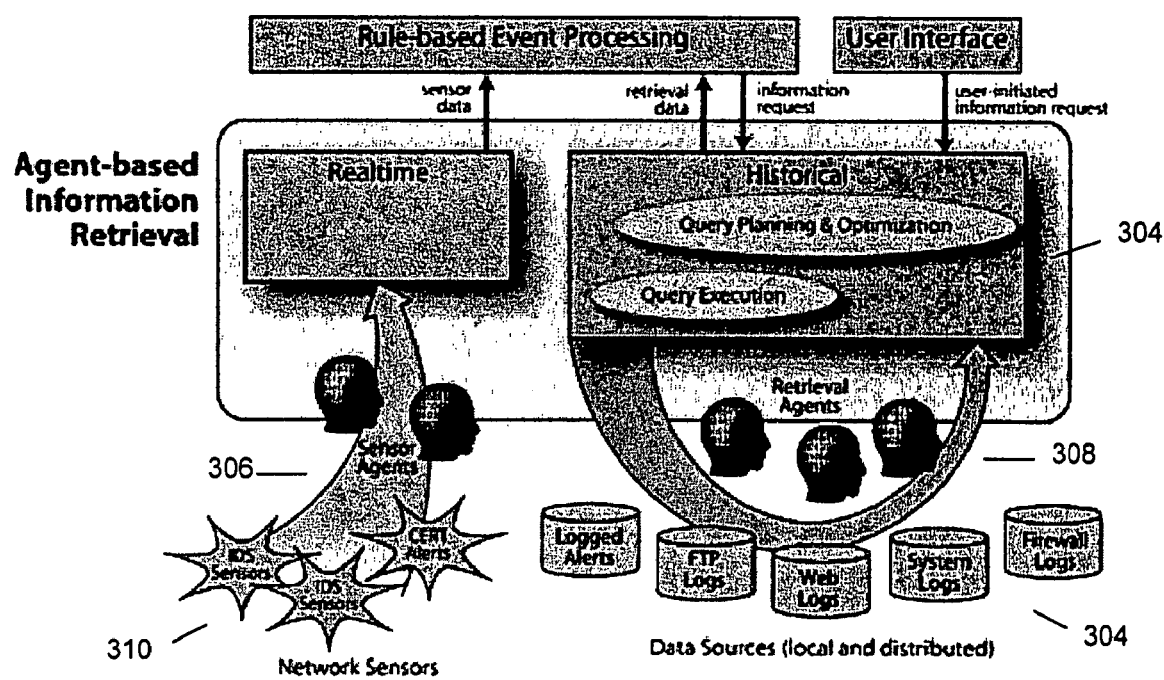
FIG. 14 illustrates a block diagram of an agent-based information retrieval component.

One embodiment of the Agent-based Information Retrieval component is illustrated in FIG. 14, and comprises available data sources 302, the agent framework and ontologies 304 which enable inter-agent collaboration, sensor agents 306 which listen for real-time cyber sensor messages from network sensors 310, retrieval agents 308 which perform queries on historical system and application data, and an event fusion module which translates, filters, and merges individual agent results. A peer-to-peer agent framework, such as the Java Agent Development Framework (JADE), can be used to provide a robust mobile agent infrastructure. JADE is an open-source software framework to develop agent-based applications in compliance with the FIPA (Foundation for Intelligent Physical Agents) specifications for interoperable intelligent multi-agent systems and the ACL (Association for Computational Linguistics) standards for agent communications. JADE is the work of Telecom Italia Lab, the R&D branch of the Telecom Italia Group. Further details for JADE can be found at http://jade.tilab.com; information about FIPA can be found at www.fipa.org.

JADE supports various transport protocols, including Java RMI, event-notification, HTTP, and IIOP and defines an ontology-based object vocabulary for inter-agent messaging. JADE also can support user-defined content languages and ontologies. The ontologies that can be used for INAFS agent communication can be written as Java objects and developed to succinctly encapsulate information from various data sources including cyber sensors (Security Event), system event and error logs (Network Event), and application event and error logs (Retrieval Event), among others. Additionally, the Pattern Event object encapsulates the result of applying pattern matching and statistical analysis to a series of Security Event objects.

Figure 15:
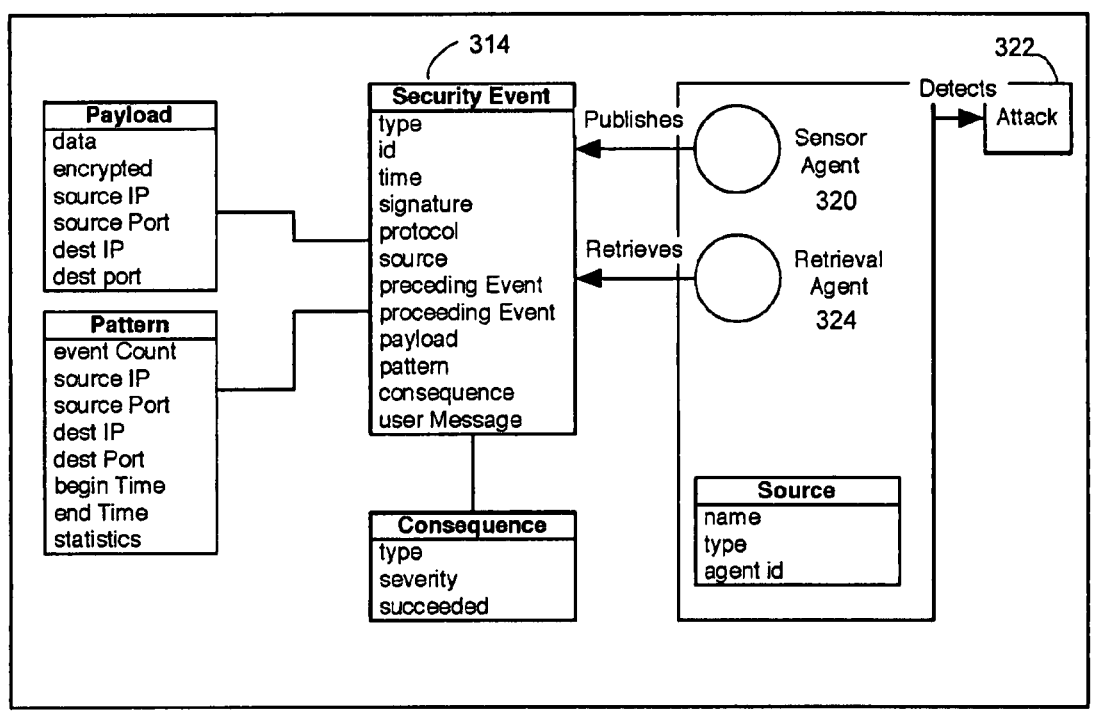
FIG. 15 illustrates an embodiment of a security event ontology.

Various ontologies for gathering data will now be described. An embodiment of the Security Event ontology is illustrated in FIG. 15. The ontology of FIG. 15 is a target-centric model and developed based on the Snort database schema and current cyber security literature. The embodiment encapsulates the information contained in Snort alert messages or in a pattern of such alerts (for example events having the same destination IP or targeted to the same operating system). Security Event object messages are primarily used by sensor agents 312 to inform the system of possible new threats 314. Security Event objects are also used by retrieval agents 316 if and when the INAFS system needs access to historical security event data in order to correlate that data with the current situation state. The security event information includes information regarding the security event 318, payload 320, consequences of such events 322 and their pattern information 324.

Figure 16:
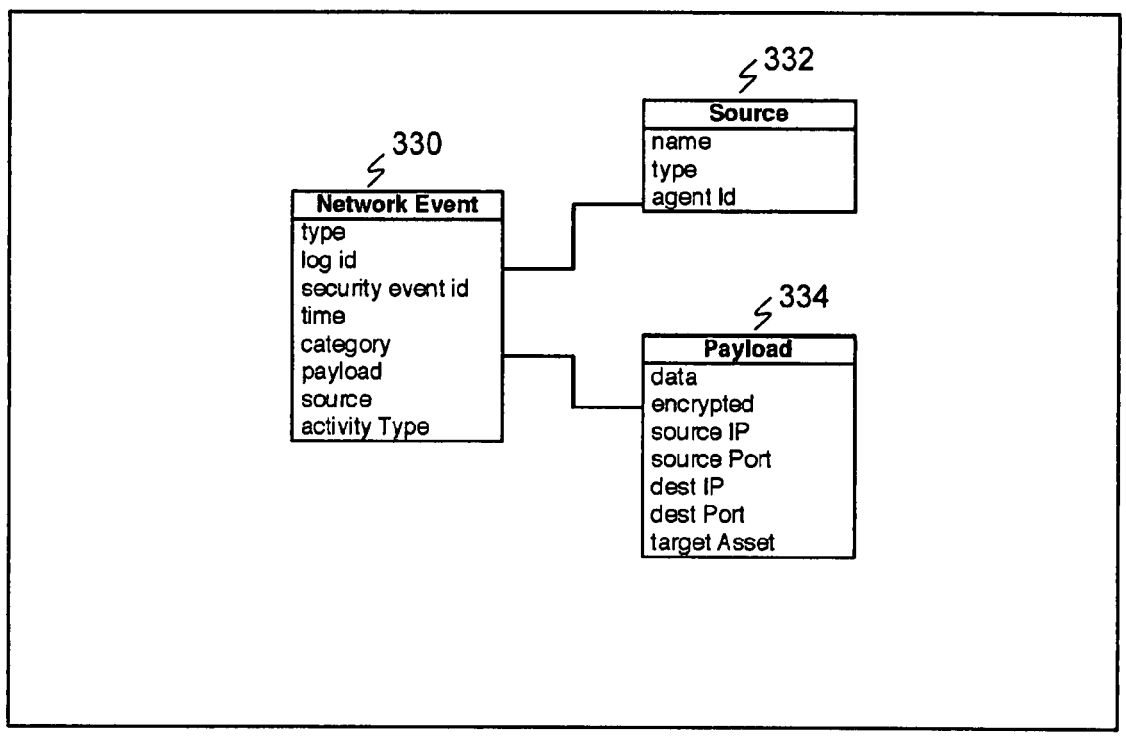
FIG. 16 illustrates an embodiment of a network event ontology.

An embodiment of the Network Event ontology is illustrated in FIG. 16, including, for example, network events 330, sources 332 and payloads 334, as shown.

Figure 17:
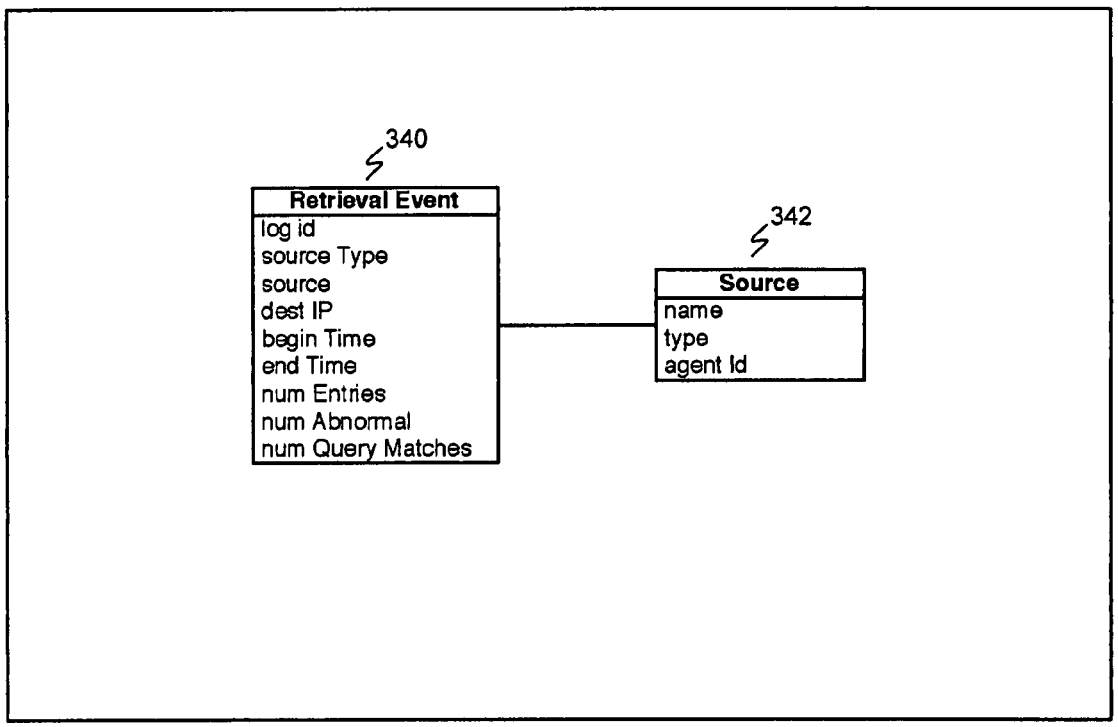
FIG. 17 illustrates an embodiment of a retrieval event ontology.

An embodiment of the Retrieval Event ontology is shown in FIG. 17. The Retrieval Event ontology includes the results gleaned from querying application, error and/or system logs. The Retrieval Event ontology is shown, for example, as including retrieval events 340 and sources 342. Retrieval Event objects can be used exclusively by retrieval agents.

Figure 18:
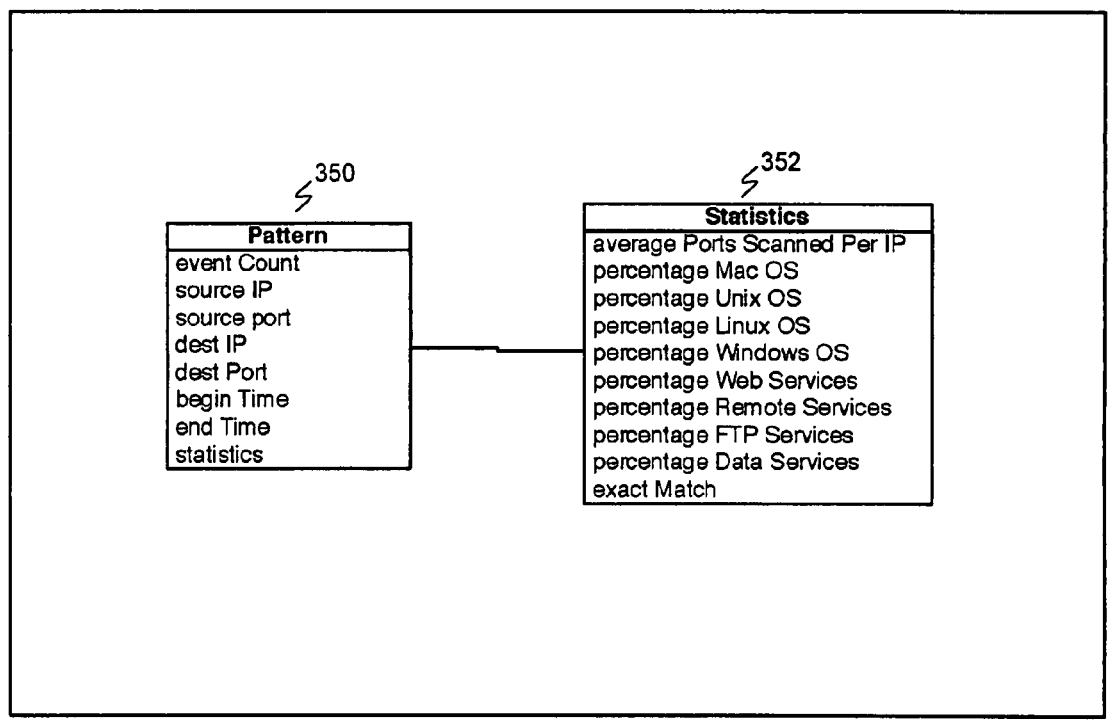
FIG. 18 illustrates an embodiment of a pattern ontology.

FIG. 18 illustrates one embodiment of a Pattern Ontology. The illustrated Pattern Ontology represents a series of related security event data 350 and the outcome of statistical analysis 352 upon that data. Pattern objects and messages are generated by the Event Fusion module, described more fully herein, in response to having exceeded a system-defined threshold of high-volume alert messages such as port scans. The INAFS is capable of handling data from a variety of input streams for developer sensors. The table of FIG. 19 describes some of these streams in terms of how they can be used by the INAFS system.

In one embodiment, sensor agents can react to new information pushed from cyber sensors and relay that information to the event fusion subcomponent of the INAFS for pre-processing. At a more detailed level, one embodiment of a sensor agent transforms the information into the appropriate ontology object, which is added to the Event Fusion module's queue. The simulation of real-time event generation was implemented by providing sensor agents with timer-based cyclic behaviors whereby an agent performs the task of obtaining new information once per cycle.

In one embodiment, Retrieval agents respond to new information requests, perform querying tasks against recent and historical event data to find relevant records, and relay the information gleaned from these records to the Event Fusion module for pre-processing. Retrieval requests are both data-driven (e.g. confined to searches for a single given IP address) and time-constrained (e.g. confined to records between a given start and end time). Information requests will be initiated by the Rule-based Event Processing system.

In one embodiment, requests are received by the Retrieval Agency subcomponent which is responsible for query planning and optimization and which uses system and domain knowledge to break information needs into individual agent tasks. Each task can be assigned to a retrieval agent for query execution.

In one embodiment, the INAFS SIEM implements query planning and optimization techniques to improve the efficiency of data retrieval from multiple sources. Query planning can involve generating a set of sub-queries from a high-level query based on the data source locations that have parts of the required information to answer the query. Query planning is the process of decomposing the query and finding suitable agent-migration paths that will include all of the required data in the correct order. The algorithm associated with query planning can be informally described as follows: First the system consults its catalog of data sites to determine where each required data type is physically located on the network. The system then generates a retrieval plan that assigns a single or group of mobile agents to retrieve the required data from each of these sites.

Not all retrieval plans are optimal. For example, the order of retrieval can greatly affect the size of data transferred and hence the total time required for data retrieval. The query optimization process, therefore, can involve applying various heuristics to the retrieval plan such that the total size or amount of data transferred is minimized. Similarly, detecting the size of data to be transferred can increase query times. When two or more data sources must be merged, the system preferably transfers data from the smaller source to the larger source.

In one embodiment, the final step in carrying out an information retrieval request is carried out by a Query Execution module, which controls all aspects of agent creation, migration, and collaboration. The module receives a list of sub-queries from the Planning and Optimization system and generates a series of mobile agents to carry out these sub-queries. The module creates for each agent an itinerary of the various sites to be visited and the data retrieval and processing tasks to be executed at each site. In one embodiment, agents are specialized by data format and are spawned with fixed itineraries. In another embodiment, a new approach is incorporated in order to query execution in which agent migration and query retrieval order is based on locally available information, such as dataset size and computational power of each data server.

In one embodiment of the Event Fusion module described more fully herein, the Event Fusion module collects information from sensor and retrieval agents, interprets and translates these messages into a canonical form, and communicates with a Rule-based Event Processing system. Event Fusion can be configured to make intelligent decisions about which events are duplicates, which are representative of a trend or trends, and which should be forwarded for immediate processing. For example, multiple port scans are collected into one aggregate event (pattern) that characterizes the collection. Event Fusion applies pattern matching and statistical analysis to event pattern data.

In one embodiment, the Event Processing component of the INAFS uses a rule-based framework to support alert and evidence generation and response generation via the acceptance, filtering, and processing of retrieved data from the Agent-based Information Retrieval component. Alerts generated by event processing are sent to the user interface for visualization, and evidence generated is sent to the belief network models for network assessment.

Figure 20:
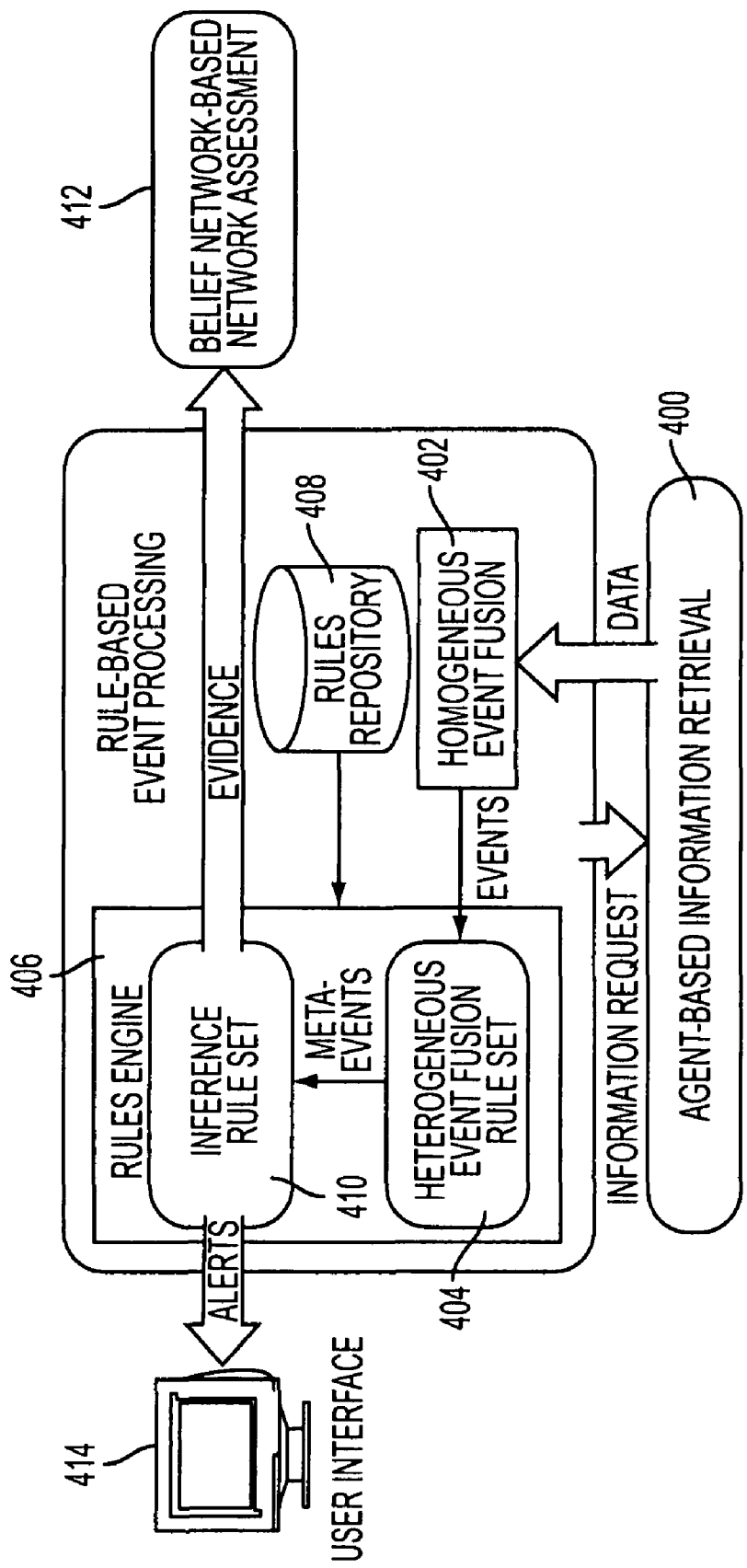
FIG. 20 illustrates one embodiment of a rule-based event processing component.

FIG. 20 illustrates one embodiment of rule-based event processing. Event processing can begin by taking raw data obtained by the information retrieval component 400 and converting the data using homogeneous event fusion subcomponent 402 into a form appropriate for a rule-base application. The homogeneous event fusion sub-component 402 refers to aggregation of similar type events and is achieved via statistics. Heterogeneous event fusion subcomponent 404 considers events and data of different types and sources. The rules engine 406 handles heterogeneous fusion by employing a rule set containing rules that are designed to identify event sets of significance and create meta-events that describe the fused events. Finally, inference rule set 410 identifies conclusions that can be drawn based on the presence of events and meta-events in the rules engine 406. These conclusions enact the generation of evidence for the belief network models 412 and alerts for the user interface 414. The knowledge set contained in the rules depository 408 necessary for this component can be extracted from doctrinal and tactical information sources and from knowledge elicitation sessions with subject matter experts. The rules based engine can be of a type known as JBoss Rules COTS, a high-performance, lightweight rule engine, which can form the core knowledge management and reasoning tool for addressing event and alert generation and supporting evidence accrual mechanisms for the proposed INAFS, although other rules based engines can be employed for this purpose.

For a simple prototype, implementation of event processing can defer many of the tasks to a network-based belief network assessment component and an agent-based information retrieval component. Specifically, event fusion can be limited to homogeneous sets and performed by an agent-based information retrieval component as the data is received from its source. An example of homogeneous event fusion can include port scan aggregation to characterize a set of port scans from the same source IP address. Some rudimentary metrics of the 'intent' of a port scan set can be used to determine the aggregation criteria. Sets can be divided by source IP address to make the subsequent set statistics representative of the interests of the identified source IP address. Relevant statistics recorded can include a number of scans in the set, distribution of target IP addresses, operating systems distribution for the target IP addresses, and services distribution of the target IP address. These data can provide a measure of the scan set's interests. For example, if the distribution of target IP addresses is numerous, then the scan may be classified as a broad horizontal scan. If the distribution of target IP addresses includes fewer targets and the targets have commonalities in operating systems and open services, then the scan set may be classified as a concentrated vertical scan. Other examples of port scan event fusion might aggregate data based on target IP addresses to create a measure of how interesting a particular machine is to the outside world.

Rules

The event processor can, as an example, include simple Java IF-THEN constructs to enforce rules firing. A simple rule illustrates how a rule operates on available data to draw conclusions about the data:

IF there is a port scan set S, and S includes at least x scans and the percentage of scans targeting web services is above 90%, THEN issue an alert for a concentrated port scan and update the belief network models with evidence of a concentrated port scan.

In this limited case, the rule looks for a port scan set where there are at least X scans from the same source IP address with at least 90% of those scans scanning an asset that is running a web service. When such a set is found, the rule sends an alert to the user interface and posts the conclusion to the belief network models.

While this limited case did not center on event processing and rule-based inference, other embodiments can focus more intently on the Rule-based Event Processing component and implement larger and more robust inference and event processing algorithms. Homogeneous event fusion that had been deferred to the agent-based information retrieval component in the limited embodiment, should be moved to its rightful place within the rule-based event processing component to consolidate the event fusion modules within the same component. Homogeneous event fusion can interface with rule-based heterogeneous event fusion to support the discovery of meta-events and finally rule-based inference for alert and evidence generation.

Also, for a more robust system, the event processor should respond to conclusions inferred within the Belief Network based Network Assessment component by extending the INAFS functionality to provide the decision maker with one or more recommended actions that would remediate the impact of the current network threats. Specifically, inference rule sets can be developed to model recommended actions in response to cyber attacks. The development should be undertaken with significant contribution from subject matter experts and with knowledge sets extracted from doctrinal and tactical information sources such as US-CERT advisories and Snort signatures.

In one embodiment the specific rule-based environment selected for implementing the information filtering functionality is provided by JBoss Rules. In making this choice, several important arguments that originate in the rule based inference formalism and in the capabilities provided by the JBoss Rules environment can be relied upon:

A. Rule engines implement instantaneous reaction mechanisms in response to changes in the environment. Rules, for example, can match on object attributes, and as soon as a change of value takes place in an attribute that is a precondition for a rule, the rule is triggered. This ensures immediate filtering processing and real-time information delivery to the user.

B. The rule engines can support virtual parallelism of event processing, by allowing multithreaded rule engines to run concurrently. This ensures that the filtering processing is carried out autonomously, and is not affected due to sequential rule scheduling mechanisms.

C. Rules can ensure the tractability and ease of elicitation of information filtering and response recommendations knowledge. It is desirable to trace the network threat assessment process. At the same time, given the diversity and complexity of the data and information and associated events that are considered for deployment, one can elicit the corresponding knowledge from subject matter experts. Rules represent a particularly adequate form in which experts are able to formulate their reasoning, and to explain mental processes.

D. Rule-based truth maintenance can support the continuous maintenance of paced information consistency across various operational scenarios and context. Advanced rule-based systems (like ILOG JRules) offer the capability of retracting all the facts that have been asserted, so that as assumptions change over the course of time, information consistency is maintained.

E. Advanced rule technology can provide high-level interfaces for rule editing in terms specific to the application domain. This feature can support scenario configuration and management by users who are not knowledge management experts, but who need to adapt event generation functionality and interpretation to concrete operational conditions.

F. Rule-based systems are capable of tying in information representations that include objects, relational database systems, and procedural components. This aspect can be useful for the proposed INAFS application as the types of information used in information filtering and response recommendations originate in a variety of sources and formats, and the actions that need to be taken as a result of the data interpretation can vary from posting information, controlling a visualization API, or interacting with other components.

G. Rule-based systems can offer the potential for adding supplementary processing and reasoning capabilities for information filtering. In general, current rule technology supports the development of open architectures that interface well with other formalisms and tools.

Rules Engine

Rules engines are a versatile and customizable method of implementing conditional rules within an application. As previously described, in one embodiment the Rules Engines uses JBoss Rules (formally DROOLS) so as to implement a sizeable portion of the applications functionality. In JBoss Rules, standard hard-coded conditional statements (i.e. if/then statements) are replaced by XML-scripted (or DRL-scripted) rules which are then fed into a Package Builder, creating a Rules Package that can be loaded into the INAFS application. This procedure can exist outside of the application itself, or within it.

Once a package is loaded into the rules engine, the conditional statements it contains are called whenever data entered into the rules engine meets the conditions described by the rules. The actions invoked by the rules are determined entirely by the developer. The rules engine can call arbitrary functions.

The advantage to using a rules engine is at least twofold: first, it can allow the conditional rules to be changed without requiring any changes to the application source. Not only does this drastically increase the rate at which the rules can be modified, it also reduces the source-code knowledge needed to modify the rules. Secondly, the rules engine can serve as a database: objects containing useful data (also called facts) can be stored and removed from the rules engine. Once inside the rules engine, these facts are used to trigger the rules and their resulting functions. In the case of the INAFS SIEM, various events and objects will serve as facts, prompting the application to execute various rules using JBoss Rules. JBoss Rules will also serve as a unifying storage medium for the various agents within the application.

Network Security Incident Detection

A Belief Network (BN) is a graphical, probabilistic knowledge representation of a collection of variables describing some domain, yielding a domain model. The nodes of the belief network denote the variables and the links denote causal relationships between the variables. The topology encodes the qualitative knowledge about the domain. Conditional probability tables (CPTs) encode the quantitative details (strengths) of the causal relationships. The belief network encodes the relationships over the domain comprising the binary variables. As an example, in FIG. 21 the binary variables include Injury, Rain, Game, Transport, Electricity, and Commentary. This topology captures the common sense knowledge that:

Rain causes Transport disruption

Rain causes Electricity failure

Game causes running Commentary on the radio

Injury and Rain prevent Game from being played

Figure 21:
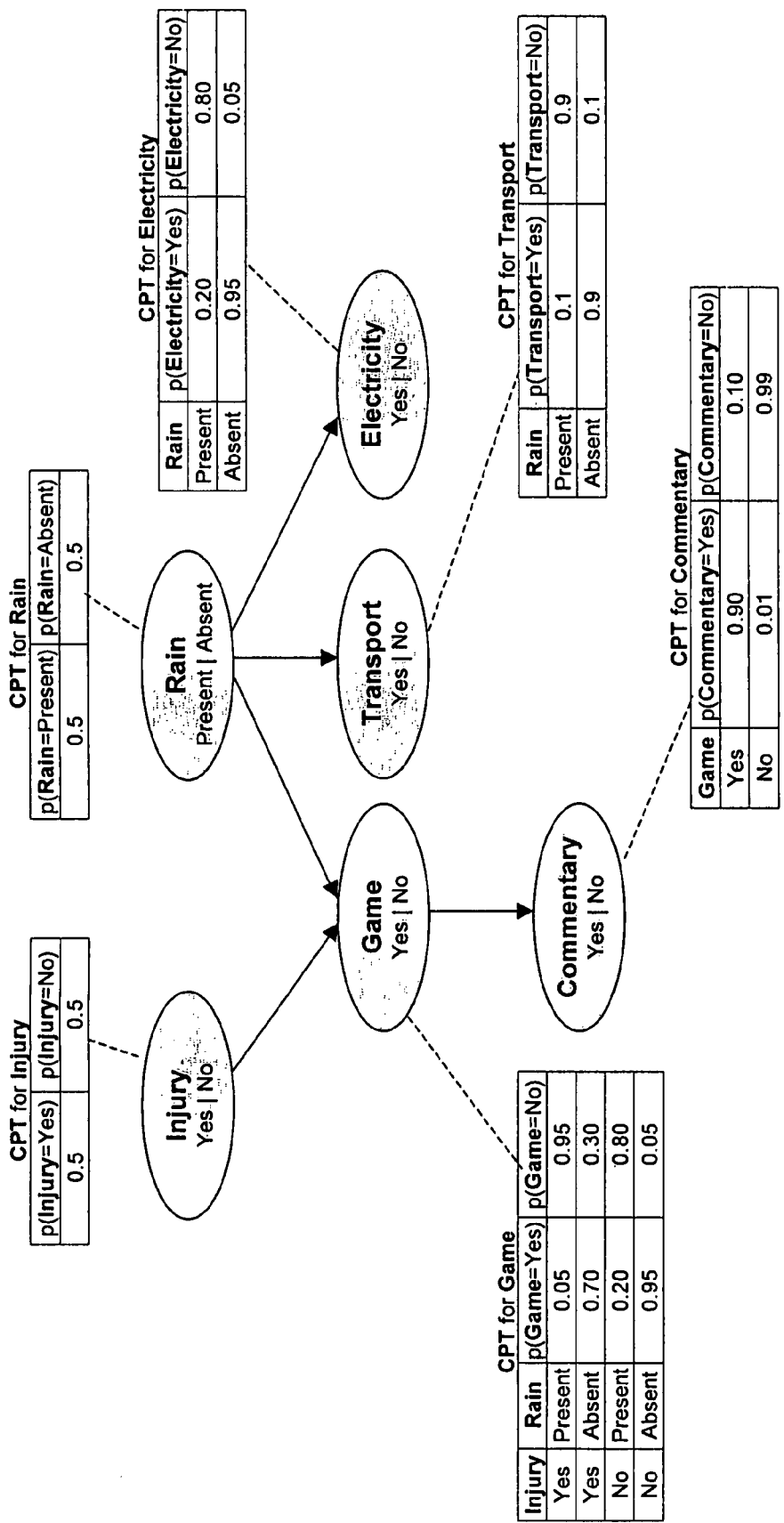
FIG. 21 shows an illustration of a simple Bayesain Belief Network (BN)

As shown in FIG. 21, a CPT specifies the probability of each possible value of a child variable conditioned on each possible combination of its parent variable values. For example, the probability of having electricity during rain is only 0.2, whereas the probability of having electricity with no rain is 0.95.

The chance that a node of a BN is in a particular state is termed its 'belief' in the state, reflecting the probability that the node is in that state given all the previous evidence received. The structure of a belief network encodes other information as well. Specifically, the lack of links between certain variables represents a lack of direct causal influence, that is, they indicate conditional independence relations. This belief network encodes many conditional independence relations, for example, $$Electricity \perp Transport | Rain \quad (1)$$

$$Commentary \perp [Rain, Electricity] | Game \quad (2)$$

where ⊥ is read 'is independent of' and | is read 'given.' That is, once the value of Rain is known, the value of Transport adds no further information about Electricity. Similar conditional independence assertions hold for the other variables. When new evidence is posted to a variable in a BN, that variable updates its own belief vector and then sends out messages indicating updated predictive and diagnostic support vectors to its children and parent nodes respectively. These messages are then used by other nodes to update their belief vectors and to propagate their own updated support vectors. The separation of evidence yields a propagation algorithm in which update messages need only be passed in one direction between any two nodes following posting of evidence. Thus, the algorithm's complexity is proportional to the number of links in the network. This separation also automatically prevents the possibility of double-counting evidence.

Figure 22:
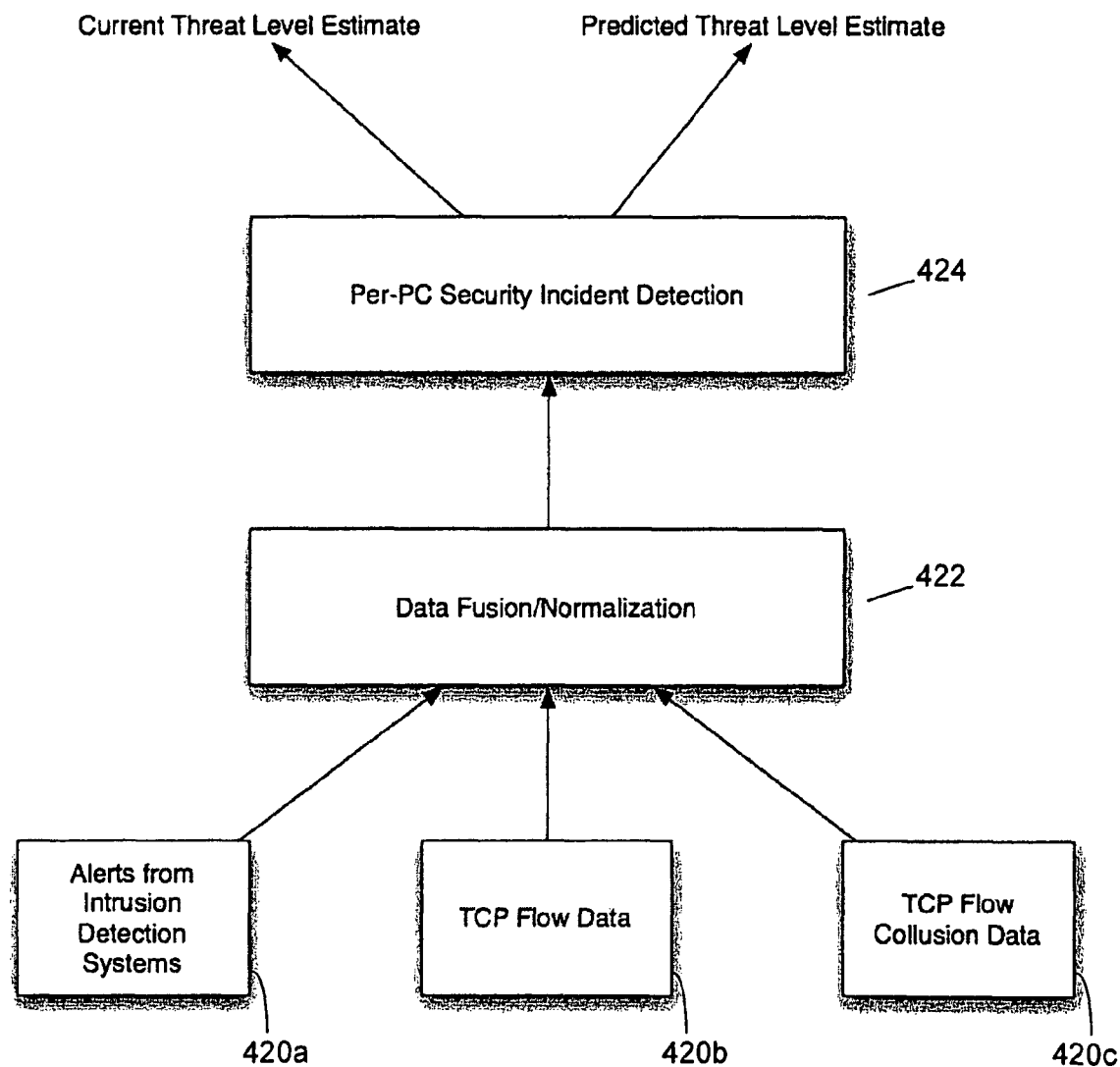
FIG. 22 shows an embodiment of an overall architecture of the mechanism for detecting a cyber attack.

The INAFS includes continuous or dynamic time belief networks. The following outlines an approach to detect security incidents using continuous or dynamic time belief networks. FIG. 22 illustrates an embodiment of the overall architecture of the mechanism for detecting a cyber attack. Data from multiple sources (e.g., 420a, 420b, 420c) are fused together via the Data FusionlNormalization module (422). The data then flows into multiple Security Incident Detection blocks (424), one being shown in FIG. 22. In one embodiment, there is one block per work station on the defended network, although blocks can be shared by work stations, or on block can be used for the entire network, depending upon the application. The techniques described here form the core of one Security Incident Detection processing block.

Figure 23:
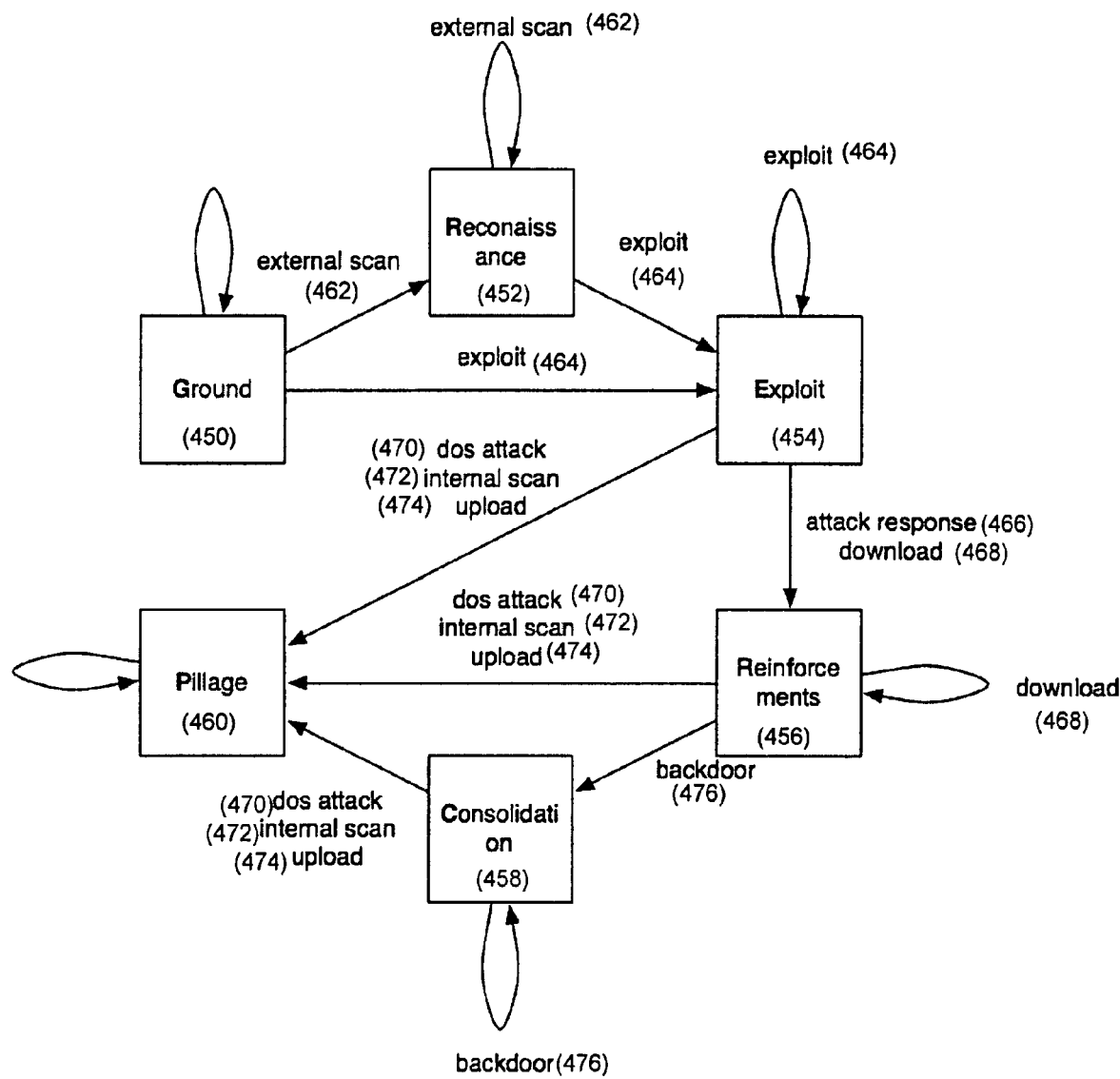
FIG. 23 illustrates an embodiment of a transition model showing the various transition states of a detection system.

In general detection of a cyber attack is carried out in states, each state using its own set of belief networks to detect a cyber attack. FIG. 23 illustrates one embodiment of the overall transition model. In the embodiment shown in FIG. 21 six states in the model include: Ground 450, Reconnaissance 452, Exploit 454, Reinforcements 456, Consolidation 458, and Pillage 460. The illustrated embodiment includes eight events that trigger state transitions: external scan (es) 462, exploit (e) 464, attack response (ar) 466, download (dl) 468, denial of service attack (d or dos) 470, internal scan (is) 472, upload (ul) 474 and download (dl) 476. Clearly, the number of states and trigger state transitions can vary from the illustrated embodiment.

FIG. 24 shows a simple two phase representation of a Continuous or Dynamic Time Belief Network with two hidden nodes 480 labeled Xt capturing the state at time t and nodes 482 labeled Ot capturing the observation at time t. A continuous or dynamic time belief network system can include:

a RateMatrix: which specifies the transition rates for each state. This determines the distribution of the time spent in a particular state, and the transition probability from a given state to any other state (indicated by nodes 480a, 480b) given that a transition has occurred.

an ObservationMatrix: which specifies the observation probabilities conditioned on the current state. This captures the "noise" associated with estimating the system state from a given observation. Note that some observations can "estimate" the system state with probability 1. That is, the observations give the system state.

Regarding system parameters, the RateMatrix and the ObservationMatrix specify an example for one embodiment of FIG. 23. The two matrices, however, can be represented in different ways. They are represented in "Symbolic" form where all matrix elements are represented as a symbol (including elements that would zero in practice due to the restrictions on state transitions), "Reduced Symbolic" form where only non-zero elements are represented in symbolic form, and in "nonsymbolic" form where all matrix elements are specified in terms of real-numbers. The instantiated matrices Rate Matrix and Observation Matrix contain arbitrary numbers that could conceivably characterize an attack. In practice, the numbers used to populate these matrices are obtained from analysis of data, attack trends, vulnerability trends, honeypot ground truth, etc. The detection algorithm is only as good as the data used to create the model. The parameters could also be made to adapt to long term averages etc. if that is desired.

State Estimation and Prediction Given Observations

The following function is one embodiment of the core detection and prediction algorithm. Given a sequence of events (eventSequence_, the system parameterization matrices (rateMatrix and observationMatrix), the function estimates at each event time the current state of the system, and then predicts the distribution of the future system state predictDelta seconds in the future. The function returns three matrices: observationlist, currentStatePDFList and predictedStatePDF. observationList includes the ground truth, currentStatePDFList includes the estimates of the system state at each observation instant and predictedStatePDF includes the predicted state at time t+predictDelta.

```
EstimateAndPredict[eventSequence_,
rateMatrix_, observationMatrix_, predictDelta_]:=
Module[{t, currentStatePDF, predictedStatePDF, transitionMatrix,
currentTime, currentObservation, observationGivenXPDF,
&, LastEventTime, currentStatePDFList,
predictedStatePDFList, observationList}predictedStatePDFList,
observationList},
currentStatePDF = {1,0,0,0,0,0};
lastEventTime = 0;
transitionMatrix = MatrixExp[(rateMatrixδ)]//MatrixForm;
currentStatePDFList = { };
predictedStatePDFList = { };
observationList = { };
Do[
(*Estimatecurrentstate.*)
currentTime = eventSequence[[t, 1]];
δ = currentTime−lastTime;
currentObservation = eventSequence[[t, 2]];
TransitionMatrix = MatrixExp[(rateMatrixδ)];
observationGivenXPDF =
observationMatrix[[currentObservation, All]];
If[δ > 0,
(*
Don'tcalculatecurrentStatePDFforfififirst
observationasthatisthestartingpoint.
UsedefaultgroundstatePDF.
*)
currentStatePDF =
(currentStatePDF.transitionMatrix)observationGivenXPDF;
currentStatePDF =
currentStatePDF/Total[currentStatePDF];
,
(* else do nothing *)
];
(*Predict state in predictDelta s*)
transitionMatrix = MatrixExp[(rateMatrixpredictDelta)];
predictedStatePDF = (currentStatePDF.transitionMatrix);
lastTime = currentTime;
AppendTo[currentStatePDFList, currentStatePDF];
AppendTo[predictedStatePDFList, predictedStatePDF];
actualState = {0,0,0,0,0,0};
```

-continued

```
  actualState[[currentObservation]] = 1;
  AppendTo[observationList, actualState];
  ,
  {t,1, Length[eventSequence]} ];
  Return[
  {observationList, currentStatePDFList, predictedStatePDFList}
  ];
  ];
  General::spell1 :
```

In the embodiment shown, the program then loops through all of the event sequences in EventMatrixList so as to obtain the results of the EstimateAndPredict function for each event sequence. The results are stored in the detectionAndEstimationMatrix for later processing. The EstimateAndPredict function prints out the event sequences fed into it for debug purposes, they can be seen below.

```
  rateMatrix=TransitionRateMatrix;
  observationMatrix = ObservationMatrix;
  predictDelta = 60;
  estimationAndPredictionResults = { };
  Do[
  eventSequence = EventMatrixList[[i]];
  results = EstimateAndPredict[
  eventSequence,
  rateMatrix,
  observationMatrix,
  predictDelta
  ];
  AppendTo[estimationAndPredictionResults, results];
  Print[eventSequence];
  ,
  {i, Length[EventMatrixList]} ];
  (*OutputofEstimateAndPredictfunctionfollows.*)
```

TABLE 2 shows an example of an input for the EstimateAndPredict function. Each line represents an EventMatrix with one event of each of the six event types and the corresponding time at which the event occurs.

TABLE 2

| | | | | | |
|---|---|---|---|---|---|
| {{0, 1}, | {1141.03, 2}, | {6845.86, 3}, | {6888.34, 4}, | {7104.64, 5}, | {7212.13, 6}} |
| {{0, 1}, | {6129.81, 2}, | {13807.5, 3}, | {13857.1, 4}, | {13923.3, 5}, | {13942.4, 6}} |
| {{0, 1}, | {2739.82, 2}, | {3465.24, 3}, | {3483.41, 4}, | {3659.89, 5}, | {3744., 6}} |
| {{0, 1}, | {9888.74, 2}, | {19006.7, 3}, | {19014.2, 4}, | {19028.5, 5}, | {19077.2, 6}} |
| {{0, 1}, | {7372.38, 2}, | {8572.86, 3}, | {8597.62, 6}} | | |
| {{0, 1}, | {383.552, 2}, | {671.879, 3}, | {746.89, 4}, | {887.378, 5}, | {977.595, 6}} |
| {{0, 1}, | {1854.3, 2}, | {5733.96, 3}, | {5761.07, 4}, | {5800.64, 6}} | |
| {{0, 1}, | {2441.57, 2}, | {8625.43, 3}, | {8635.49, 6}} | | |
| {{0, 1}, | {4575.81, 2}, | {4865.62, 3}, | {4865.98, 4}, | {5371.2, 6}} | |
| {{0, 1}, | {932.707, 2}, | {2492.89, 3}, | {2543.34, 4}, | {4142.21, 5}, | {4179.69, 6}} |

The following TABLE 3 is an example of the first element of the estimationAndPredictionResults matrix. This table shows the actual observations or events that occurred in a simulation. Each row corresponds to a time slice, with the top row corresponding to time zero. Each column of the table corresponds to a particular state. The left hand column corresponds to state 1and represents the ground state, while the right hand column corresponds to state 6 or the attack state. Each element in the table corresponds to the probability that the system is in that state at that time. The first table is the actual observation, which in this case, maps to ground truth. As this table represents the ground truth, the probability is 1 for each event in the example shown. The system moves from state 1, through state 2 and 3 and finally state 6.

TABLE 3 estimationAndPredictionResults[[1, 1]]

| | | | | | |
|---|---|---|---|---|---|
| 1 | 0 | 0 | 0 | 0 | 0 |
| 0 | 1 | 0 | 0 | 0 | 0 |
| 0 | 0 | 1 | 0 | 0 | 0 |
| 0 | 0 | 0 | 1 | 0 | 0 |
| 0 | 0 | 0 | 0 | 1 | 0 |
| 0 | 0 | 0 | 0 | 0 | 1 |

Table 4 provided below shows the state estimates for each time slice. Note that there is a one to one correspondence between each element in the table below and the table above. Given that the table below is estimating the table above, one would ideally like to see most of the probability mass in the Table 4 centered around elements that contains "1's" in the TABLE 3, above.

TABLE 4 estimationAndPredictionResults[[1, 2]]

| | | | | | |
|---|---|---|---|---|---|
| 1 | 0 | 0 | 0 | 0 | 0 |
| 0.756408 | 0.239746 | 0.00384619 | 0 | 0 | 0 |
| 0 | 0 | 1 | 0 | 0 | 0 |
| 0 | 0 | 0.892393 | 0.107607 | 0 | 0 |
| 0 | 0 | 0 | 0.920642 | 0.0793577 | 0 |
| 0 | 0 | 0 | 0 | 0 | 1 |

The table below shows the state predictions at each time slice (i.e. observation time) in the illustrated example. These predictions are for the state system predictDelta (in this case 60) seconds in the future.

TABLE 5 estimationAndPredictionResults[[1, 3]]

| | | | | | |
|---|---|---|---|---|---|
| 0.983471 | 0.0163912 | 0.000100973 | 0.0000174233 | 3.16027 × 10 − 7 | 0.0000186426 |
| 0.743906 | 0.248181 | 0.00399276 | 0.0018063 | 0.0000563557 | 0.00205732 |
| 0. | 0. | 0.367879 | 0.287161 | 0.0103222 | 0.334637 |
| 0. | 0. | 0.328293 | 0.347348 | 0.0143615 | 0.309997 |
| 0. | 0. | 0. | 0.779307 | 0.0732562 | 0.147437 |
| 0. | 0. | 0. | 0. | 0. | 1. |

FIGS. 25-27 graphically display the information provided in TABLES 3-5, respectively.

In order to observe the results:

```
ListPlot3D[estimationAndPredictionResults[[1, 1]],
ImageSize → {725,725},AxesLabel→{"State","Time","Probability"},
PlotLabel→"Observations"];
ListPlot3D[estimationAndPredictionResults[[1, 2]],
ImageSize→{725,725},AxesLabel→{"State","Time","Probability"},
PlotLabel→"Estimated State|Observations"];
ListPlot3D[estimationAndPredictionResults[[1, 3]],
ImageSize→{725,725},AxesLabel→{"State","Time","Probability"},
PlotLabel→"Predicted State(t+_)|Observation(t)"]
```

Bayesian Belief Networks.

The Bayesian Belief Networks These include providing the user with the capability to perform speculative analysis; transitioning to dynamic event-based belief networks to support the capability to anticipate the next stage of an attack or the combined affect of multiple attacks; and adapting of the Bayesian network models to reflect the everchanging state of a live network.

The INAFS uses multiple Bayesian belief networks to make inferences on various aspects of the monitored network including an overall system assessment, incident detection, incident severity evaluation, and impact assessment. These Bayesian networks are embedded into the INAFS application directly and can be accessed, for example, using BNet.EngineKit, a developer toolkit and API from the present assignee, Charles River Analytics of Cambridge Mass.

Bayesian Belief Net-Based Network Assessment

An embodiment of the Network Assessment Bayesian network shown in FIG. 28. The model provides an example of an overall assessment of the network state and vulnerability by considering both internal and external data. An embodiment of the Network Assessment Bayesian network 500 shown in FIG. 28 was implemented as four sub-networks (Vulnerability 502, Attack Attractiveness 504, Attack Prevention 506, and Network Physical Health 508). The root nodes of the four subnetworks along with the root node of the Network Assessment belief network. The Network Assessment node links the four sub-networks and provides the belief about the current network situational state overall.

A. The Vulnerability sub-net 502 provides a self-assessment of how vulnerable the network is to attack.

B. The Attack Attractiveness sub-net 504 represents the current likelihood of network attacks. Factors impinging on this likelihood include the desirability from an attacker's perspective of targeting the network at hand (e.g. high value asset for a potential adversary or the garnering of publicity for a hacker).

C. The Attack Prevention sub-net 506 provides self-assessment of network defenses and how well the network is able to recognize and/or defend itself from attacks.

D. The Network Physical Health sub-net 508 provides an overview assessment of the system health specifically in terms of unusual activity and/or errors. This sub-net is the most active within the Network Assessment model.

An embodiment of the Incident Detection Bayesian network is shown in FIG. 29. The embodiment of the Incident Detection Bayesian network 540 is configured to evaluate each security event reported by the Rule-based Event Processing component. By considering the alert signatures found in the incident, the model can draw conclusions about the intent and context of the action that triggered the alert. A Incident Detection Bayesian network for each reported event or event pattern in the case of high-volume reconnaissance events was substantiated by maintaining a "window" of 10 active models to loosely approximate a dynamic belief network (DBN).

An embodiment of an Incident Severity Bayesian network (520) is illustrated in FIG. 30. Network 550 is configured to consider the aggregated results from the incident detection belief networks as well as information about the network status (Network Assessment sub-nets), and to measure the extent and importance of the incidents.

To support user hypothesis testing and user query building, the BNet.Builder, a developer toolkit for constructing Bayesian Networks and available from the present assignee, Charles River Analytics of Cambridge Mass. can provide speculative analysis. Speculative analysis entails the choosing of a key node of a network and then determining which of the other nodes have the greatest influence on the specified node.

More specifically, the technique endeavors to find which piece of evidence can answer the question posed by the target node. Within BNet.Builder, the speculative analysis process entails entering, in turn, normalized hypothetical evidence at each non-target node. This evidence is propagated through the belief network and beliefs for each of the node states, including the target node, are updated. Thus, the effect on each node on the target node is calculated and a list sorted by effect on target node can be generated. The nodes with the highest effect on the target node and possess data evidence that could be acquired will be identified as the information needs.

Speculative analysis can also be used to support user initiated hypothesis testing and what-if analysis.

The INAFS uses Event-based Dynamic Belief Networks. A limitation of Bayesian belief networks is that they do not explicitly or adequately model dynamic information that may be required when modeling a changing environment such as a computer network. This limitation can reduce overall assessment accuracy and performance, thereby reducing operational utility.

In one embodiment Extending a Bayesian belief network to a Dynamic Belief Network includes the following features:

A. All nodes of the Belief N are associated with particular steps, simply by indexing the nodes with a step value.

B. Some BN nodes for a given step may have causal dependencies on nodes from earlier steps (in addition to the usual causal dependencies on nodes from their own step), such dependencies are called temporal dependencies.

The result is a Dynamic Bayesian Network (DBN). FIG. 31 illustrates the general case of time indexing and temporal dependency: the variable $Y_t$ from time step t has causal dependencies on some variables $X(i,t)$ from its own time step t; it also has causal dependencies on $X(i,t-k)$ from earlier time steps. (When temporal dependencies between nodes occur only from the immediately prior time step, the result is a Markovian model.)

Because a cyber attack may be fragmented over a very long time (weeks or months) the causal dependencies between nodes at different steps are referred to as event dependencies to reflect the idea that while events are causally related, they are not related because of time.

Hidden Markov Models (HMM) fall into a subclass of DBNs. In a DBN, directed arcs flow forward in time, representing the assumption that an event can cause another event in the future, but not vice-versa. In a DBN, the hidden state Xt as well as the observation $Y_t$ is represented by a set of random variables, each of which can be discrete or continuous. The transition and observation models are then defined as a product of conditional probability distributions as follows:

$$P(Xt|Xt-1) = \Pi^{N}_{i=1} p(X^{i}t | pa(X^{i}t)) \quad (3)$$

Where $X^{i}_{t}$ is the $i^{th}$ node in slice t, which may be hidden or observable, and $pa(X^{i}_{t})$ are the parents of $X^{i}_{t}$, which may come from the same or a previous time slice (considering only Markov Dynamic Bayesian Belief Networks (DBN).

FIG. 32 illustrates one embodiment of the DBN representing the hidden markov model, HMM {Xt, Yt}t=0, 1, 2,...

For the software implementation of DBNs, model based reasoning with temporal BNs can be used. Further, sampling based approximate inference algorithms, such as particle filtering (PF), can be used to deal with event-dependent vs. time-dependent modeling. In addition, continuous time Bayesian networks can be used in which it is assumed that the model is updated only when new observations (events) arrive to model time-sensitive attacks such as worm or virus propagation. Continuous Time Particle Filtering can also be utilized particularly for models where the observations are sparse and intermittent.

The INAFS can also include a collusion recovery algorithm. The goal of a collusion recovery algorithm is to separate out traffic from different service classes based on traffic characteristics alone. Raw tcp dump data records can be fed into the algorithm which will then extract appropriate features, and perform clustering to differentiate between different traffic classes. Conversations can be associated with service class information which can be used at higher data fusion levels to determine whether a network threat status.

Details of Bayesian Belief Networks are provided in Appendix B, incorporated herein by reference.

FIG. 33 illustrates an embodiment of the overall processing chain. The processing chain includes packet tracer/packet sniffer (600) configured to receive data packets. Packet Tracer/Packet Sniffer is shown in the form of blocks, which can be external processes that take raw packet data from either a trace file or a live network and store it as packet log files in tcpdump/libpcap format. The packets applied to packet feature extraction and normalization block (602) configured to read data from raw trace files, interpret the data, and extract all of the raw features from the data. This can be implemented as a standalone program that takes as input tcpdump/libpcap files and generates as output a series of Normalized Packet Records as, for example, an ARFF file (self-documented files using a simple format developed by the University of Waikato WAND group): http://www.cs.waikato.ac.nz/ml/weka/index.html. An ARFF file includes a simple header that describes the data source and fields, followed by a data portion, which is an array of Comma Separated Value fields with one record per line.

The normalized packet records from block 602 are then applied to flow statistics generator 604. Flow Statistics Generator 604 takes a set of features and normalized packet records as input. The generator processes each normalized packet record and extracts the set of features specified. The generator assigns each packet to a flow and maintains statistics on a flow by flow basis. A flow is a set of packet records that all share a common 5-tuple (source/destination IP address, source/destination port, and protocol). In addition to the 5-tuple, the Packet Feature Extraction and Normalization block also calculates a unique Flow ID which is an integer that uniquely represents a flow. The output of the Flow Statistics Generator is a set of Flow Statistics Records. These records are applied to filtering 606. The Filtering can be one-way, or bi-directional filtering configured to filter the flow statistics prior to recording them in the database 608. Flow Statistics Database 608 is configured to store flow statistics keyed on one or more unique Flow Identifiers. Clustering and Service Differentiation block 610 is configured to periodically extract flow statistics records from the Flow Statistics Database 608 and perform clustering algorithms on these records (e.g. Spatio-Temporal Clustering, Walsh-Hadamard transforms, etc.). The Clustering and Service Differentiation block 610 is provided with a model to be used for classification. In the illustrated embodiment, the output of block (610) is a series of Classified Flow Records in ARFF format. The Classified Flow Records can include the Flow ID, 5-tuple, and the probability that the flow is in a particular class for each of the classes in the set of potential classes. To keep track of traffic dynamics, the flow statistics can be computed both for a short (or local) time-window and for the total duration of the flow.

Impact Assessment Bayesian Network

Figure 35:
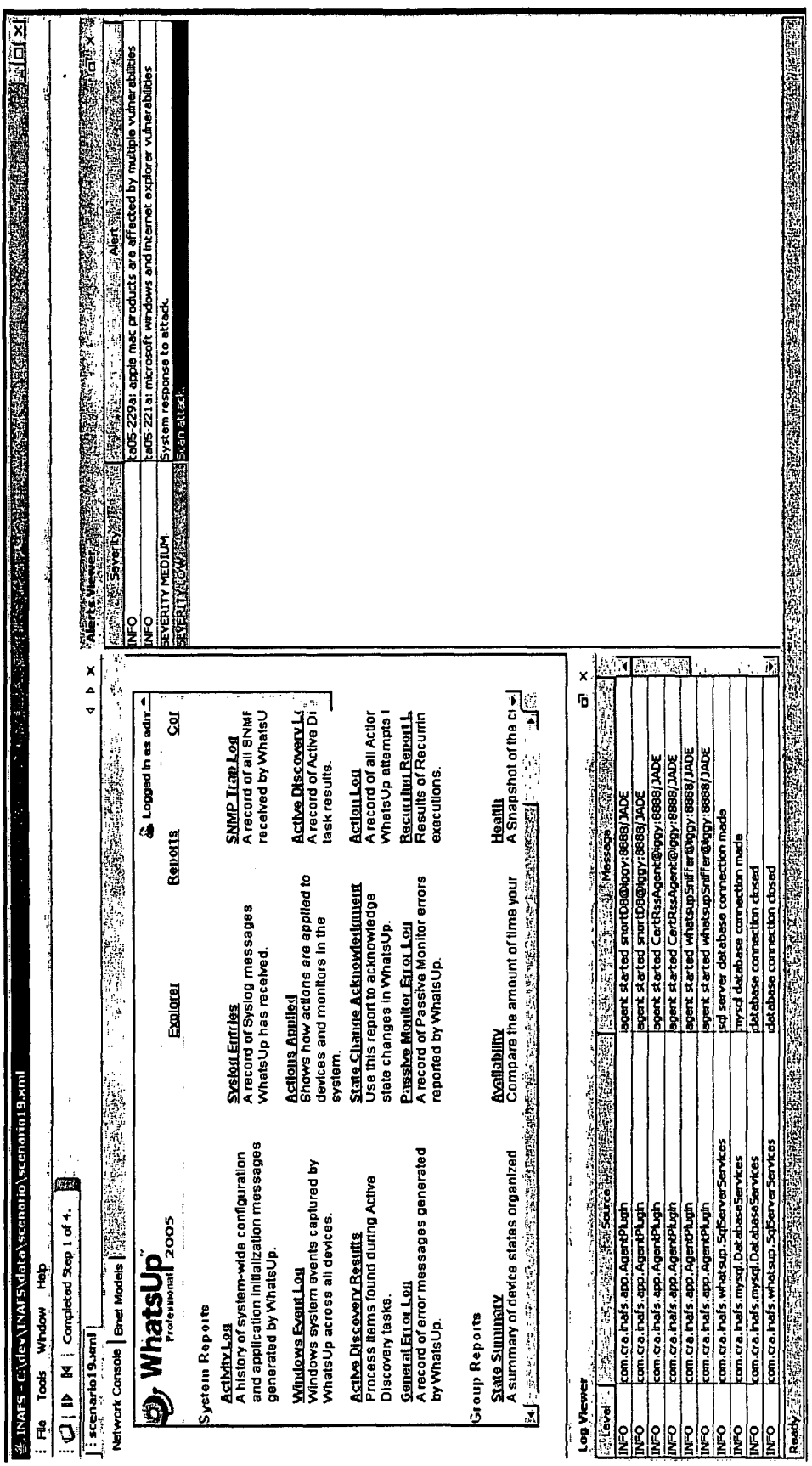

An embodiment of the Impact Assessment Bayesian network is shown in FIG. 35. This network is configured to provide an overall evaluation of the effect security incidents have on network operations, services, and legal issues. Such a model can be used to determine recommended actions based on the current situation state.

User Interface

An embodiment of the INAFS Interface is illustrated in FIG. 35 is configured to support the decision-maker by providing alert messages and indicators of current network vitality. The interface can comprise the following components:

A. INAFS Controls providing scenario controls and scenario status messages as well as allow the user to load a pre-existing scenario and to step through the attack specified by the scenario.
B. Main Viewing Area providing several views of the INAFS network and current situation state including:
   i. Network Vitality sliders provide real-time worst-case status of key network indicators;
   ii. BN models visualization allows the user to view the current beliefs for all models used by the system;
   iii. Network visualization, which can be implemented as a light integration with the WhatsUp network; and
   iv. a monitoring application by means of an embedded browser, screen-scraped the WhatsUp webbased interface.
C. Alerts Viewer displays security threat assessment messages and security-related information such as new US-CERT vulnerability advisories. All messages displayed originate from the Rules-based event processing subsystem.
D. Log Viewer displays agent status messages, warnings and errors. All messages originate from the Agent-based Information Retrieval subsystem.

The invention may be embodied in other specific forms without departing from the spirit or central characteristics thereof. The present embodiments are therefore to be considered in all respects as illustrative and not restrictive, the scope of the invention being indicated by appending claims rather than by the foregoing description, and all changes that come within the meaning and range of equivalency of the claims are therefore intended to be embraced therein.

What is claimed is:

1. A security system for detecting and responding to cyber attacks on network or network element, the system comprising:
   (a) an intelligent agent-based information retrieval subsystem configured so as to automatically search for and retrieve relevant data from distributed sources;

(b) a rule-based inferencing subsystem configured so as to interpret retrieved data within the situational context to support event and alert generation for cyber threat assessment and prediction; and (c) a threat assessment and prediction subsystem configured to capture data relating to the interrelationship between cyber sensor outputs and cyber attacks, wherein the threat assessment and prediction subsystem includes dynamic time Bayesian belief networks.

2. A security system for detecting and responding to cyber attacks on network or network element, the system comprising:

(a) an intelligent agent-based information retrieval subsystem configured so as to automatically search for and retrieve relevant data from distributed sources;

(b) a rule-based inferencing subsystem configured so as to interpret retrieved data within the situational context to support event and alert generation for cyber threat assessment and prediction; and (c) a threat assessment and prediction subsystem configured to capture data relating to the interrelationship between cyber sensor outputs and cyber attacks; and (d) a user interface configured to interface with system components including network resources and dynamic time Bayesian belief networks.

3. A security system for detecting and responding to cyber attacks on network or network element, the system comprising:

(a) an intelligent agent-based information retrieval subsystem configured so as to automatically search for and retrieve relevant data from distributed sources;

(b) a rule-based inferencing mechanism configured so as to interpret retrieved data within the situational context to support event and alert generation for cyber threat assessment and prediction; and (c) a threat assessment and prediction mechanism configured to capture data relating to the interrelationship between cyber sensor outputs and cyber attacks, wherein the intelligent agent-based information retrieval subsystem includes a data fusion architecture, wherein the data fusion architecture includes: (i) a signal/feature assessment level; (ii) an entity assessment level, (iii) a situation assessment level and (iv) an impact assessment level; and wherein the signal/feature assessment level includes flow-based analysis, IDS alerts and application alerts; the entity assessment level includes security incident detection using dynamic time Bayesian belief networks multi-target tracking, the situation assessment level includes belief networks and collusion discovery; and the impact assessment level includes believe networks.

4. A security system for detecting and responding to cyber attacks on network or network element, the system comprising:

(a) an intelligent agent-based information retrieval subsystem configured so as to automatically search for and retrieve relevant data from distributed sources;

(b) a rule-based inferencing subsystem configured so as to interpret retrieved data within the situational context to support event and alert generation for cyber threat assessment and prediction; and (c) a threat assessment and prediction subsystem configured to capture data relating to the interrelationship between cyber sensor outputs and cyber attacks;

wherein the rule-based inferencing subsystem includes a homogeneous event fusion sub-component and a heterogeneous event fusion sub-component.

5. A security system for detecting and responding to cyber attacks on network or network element, the system comprising:

(a) an intelligent agent-based information retrieval subsystem configured so as to automatically search for and retrieve relevant data from distributed sources;

(b) a rule-based inferencing subsystem configured so as to interpret retrieved data within the situational context to support event and alert generation for cyber threat assessment and prediction; and (c) a threat assessment and prediction subsystem configured to capture data relating to the interrelationship between cyber sensor outputs and cyber attacks;

wherein the threat assessment and prediction subsystem includes dynamic time Bayesian belief networks.

6. The system of claim 5, wherein the dynamic time Bayesian belief network includes a Rate Matrix and an Observation Matrix.

7. The system of claim 5, wherein the dynamic time Bayesian belief networks includes a network assessment Bayesian belief network.

8. The system of claim 7, wherein the network assessment Bayesian belief network includes one or more of the following:

a vulnerability sub-net;
attack attractiveness sub-net;
attack prevention sub-net; and
network physical health sub-net.

9. A method of detecting and responding to cyber attacks on a network or network element, the method comprising:

(a) automatically searching for and retrieving relevant data from distributed sources using an intelligent agent-based information retrieval subsystem;

(b) interpreting retrieved data within the situational context with a rule-based inferencing subsystem configured so as to support event and alert generation for cyber threat assessment and prediction; and (c) capturing data relating to the interrelationship between cyber sensor outputs and cyber attacks with a threat assessment and prediction subsystem;

wherein capturing the interrelationships between cyber sensor outputs and cyber attacks includes using dynamic time Bayesian belief networks.

10. A method of detecting and responding to cyber attacks on a network or network element, the method comprising:

(a) automatically searching for and retrieving relevant data from distributed sources using an intelligent agent-based information retrieval subsystem;

(b) interpreting retrieved data within the situational context with a rule-based inferencing subsystem configured so as to support event and alert generation for cyber threat assessment and prediction;

(c) capturing data relating to the interrelationship between cyber sensor outputs and cyber attacks with a threat assessment and prediction subsystem; and (d) an interface with network resources and dynamic time Bayesian belief networks.

11. A method of detecting and responding to cyber attacks on a network or network element, the method comprising:

(a) automatically searching for and retrieving relevant data from distributed sources using an intelligent agent-based information retrieval subsystem;

(b) interpreting retrieved data within the situational context with a rule-based inferencing subsystem configured so as to support event and alert generation for cyber threat assessment and prediction; and (c) capturing data relating to the interrelationship between cyber sensor outputs and cyber attacks with a threat assessment and prediction subsystem;

wherein automatically searching for and retrieving relevant data from distributed sources using an intelligent agent-based information retrieval subsystem includes using a data fusion architecture, wherein using the data fusion architecture includes employing a signal/feature assessment level; an entity assessment level, a situation assessment level and an impact assessment level, wherein employing the signal/feature assessment level includes employing flow-based analysis, IDS alerts and application alerts; employing the entity assessment level includes employing security incident detection using dynamic time Bayesian belief networks multi-target tracking, employing the situation assessment level includes employing belief networks and collusion discovery; and employing the impact assessment level includes employing believe networks.

12. A method of detecting and responding to cyber attacks on a network or network element, the method comprising:
  (a) automatically searching for and retrieving relevant data from distributed sources using an intelligent agent-based information retrieval subsystem;
  (b) interpreting retrieved data within the situational context with a rule-based inferencing subsystem configured so as to support event and alert generation for cyber threat assessment and prediction; and
  (c) capturing data relating to the interrelationship between cyber sensor outputs and cyber attacks with a threat assessment and prediction subsystem;
  wherein interpreting retrieved data within the situational context with a rule-based inferencing subsystem includes using a homogeneous event fusion sub-component and a heterogeneous event fusion sub-component.

13. A method of detecting and responding to cyber attacks on a network or network element, the method comprising:
  (a) automatically searching for and retrieving relevant data from distributed sources using an intelligent agent-based information retrieval subsystem;
  (b) interpreting retrieved data within the situational context with a rule-based inferencing subsystem configured so as to support event and alert generation for cyber threat assessment and prediction; and
  (c) capturing data relating to the interrelationship between cyber sensor outputs and cyber attacks with a threat assessment and prediction subsystem;
  wherein capturing the interrelationships between cyber sensor outputs and cyber attacks with a threat assessment and prediction subsystem includes using dynamic time Bayesian belief networks.

14. The method of claim 13, wherein the dynamic time Bayesian belief network includes a Rate Matrix and an Observation Matrix.

15. The method of claim 13, wherein the dynamic time Bayesian belief networks include a network assessment Bayesian belief network.

16. The system of claim 15, wherein the network assessment Bayesian belief network includes one or more of the following:
  a vulnerability sub-net;
  attack attractiveness sub-net;
  attack prevention sub-net; and
  network physical health sub-net.

* * * * *